(12) United States Patent
Crawley et al.

(10) Patent No.: US 12,474,055 B2
(45) Date of Patent: Nov. 18, 2025

(54) AXIAL FUEL STAGE INJECTOR WITH AXIALLY ELONGATED MIXING CHAMBERS WITH AXIALLY WAVY INLETS

(71) Applicant: GE Infrastructure Technology LLC, Greenville, SC (US)

(72) Inventors: Bradley D. Crawley, Greenville, SC (US); Wei Zhao, Greer, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/659,363

(22) Filed: May 9, 2024

(65) Prior Publication Data

US 2025/0347416 A1    Nov. 13, 2025

(51) Int. Cl.
| | | |
|---|---|---|
| F23R 3/00 | (2006.01) | |
| F23R 3/28 | (2006.01) | |
| F23R 3/34 | (2006.01) | |
| F23R 3/36 | (2006.01) | |

(52) U.S. Cl.
CPC .............. F23R 3/346 (2013.01); F23R 3/286 (2013.01); F23R 3/36 (2013.01)

(58) Field of Classification Search
CPC ................................. F23R 3/286; F23R 3/346
See application file for complete search history.

(56) References Cited

U.S. PATENT DOCUMENTS

| | | | | |
|---|---|---|---|---|
| 2012/0297787 | A1* | 11/2012 | Poyyapakkam | F23D 14/62 60/738 |
| 2013/0239575 | A1* | 9/2013 | Chen | F23R 3/286 60/747 |
| 2015/0285501 | A1* | 10/2015 | DiCintio | F23R 3/346 60/740 |
| 2016/0146468 | A1* | 5/2016 | Gao | F23C 7/002 60/742 |
| 2018/0023812 | A1* | 1/2018 | Laster | F23R 3/36 239/418 |
| 2018/0187893 | A1* | 7/2018 | DiCintio | F23D 14/64 |
| 2018/0187894 | A1* | 7/2018 | Cai | F23D 14/64 |
| 2019/0072279 | A1* | 3/2019 | Natarajan | F23R 3/002 |

* cited by examiner

*Primary Examiner* — Katheryn A Malatek
(74) *Attorney, Agent, or Firm* — Charlotte Wilson; James Pemrick; Hoffman Warnick LLC

(57) ABSTRACT

An axial fuel stage (AFS) injector includes a mixing member including a plurality of axially elongated mixing chambers therebetween. Inlets of the mixing chambers are axially wavy. A high-pressure (HP) air injection member defines a set of HP air jets spaced from the axially wavy inlet of each axially elongated mixing chamber. A fuel plenum in the mixing member delivers fuel from a fuel source to a set of fuel injectors in each mixing chamber. Each set of HP air jets is configured to direct an HP air from an HP air source and, optionally, to draw a low-pressure (LP) air from an LP air source to direct the LP air with the HP air and the fuel into the axially wavy inlet of a respective axially elongated mixing chamber. The axially elongated mixing chambers direct the air-fuel mixture into the combustion liner for combustion in a secondary combustion zone thereof.

20 Claims, 12 Drawing Sheets

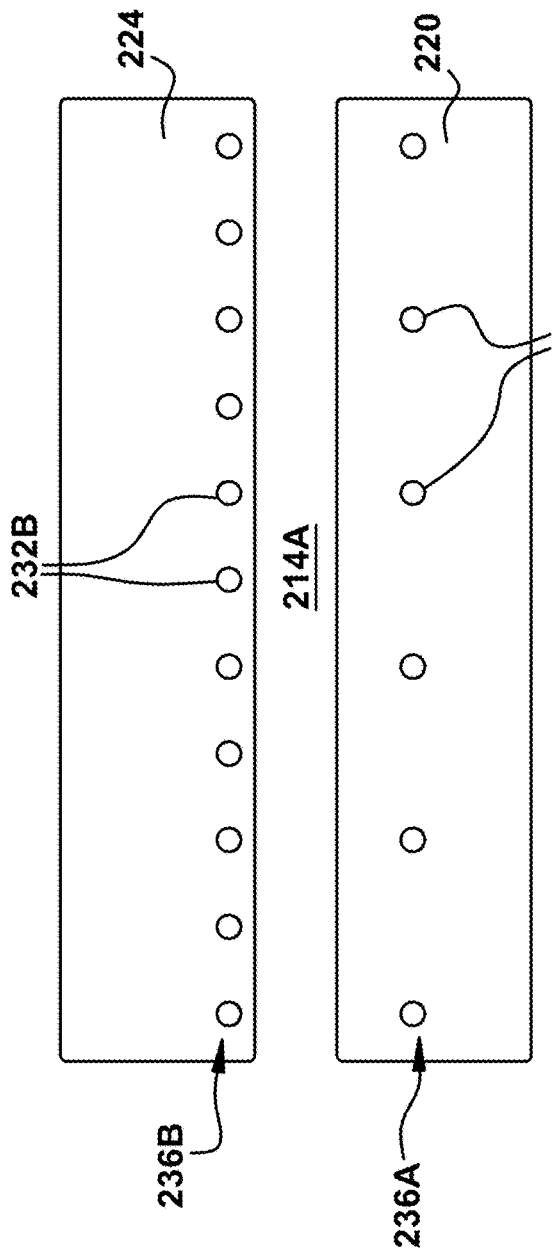
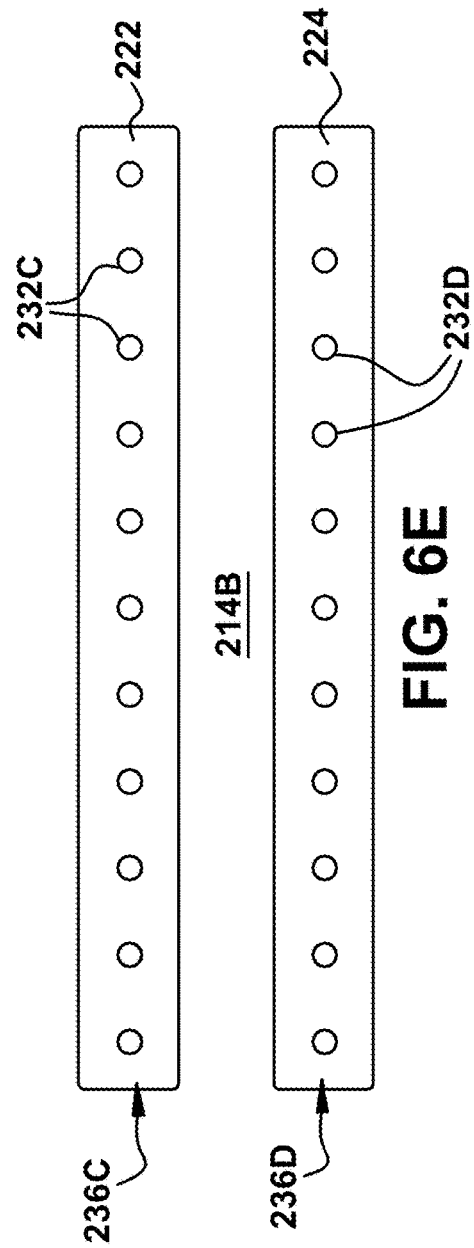

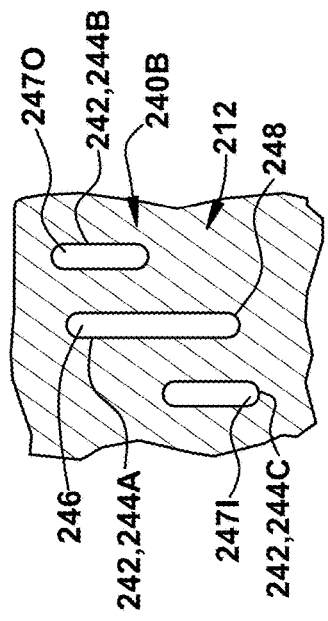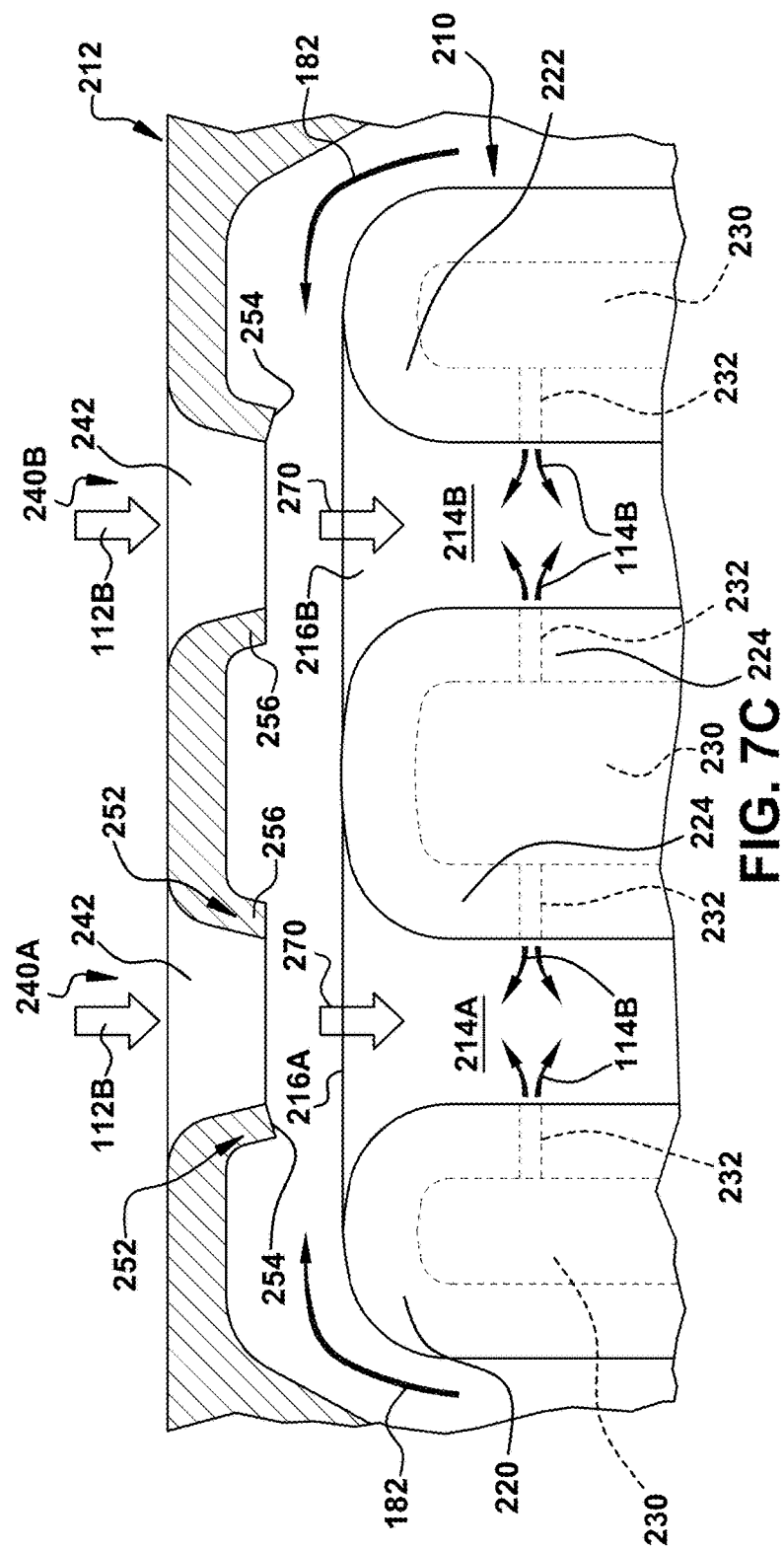

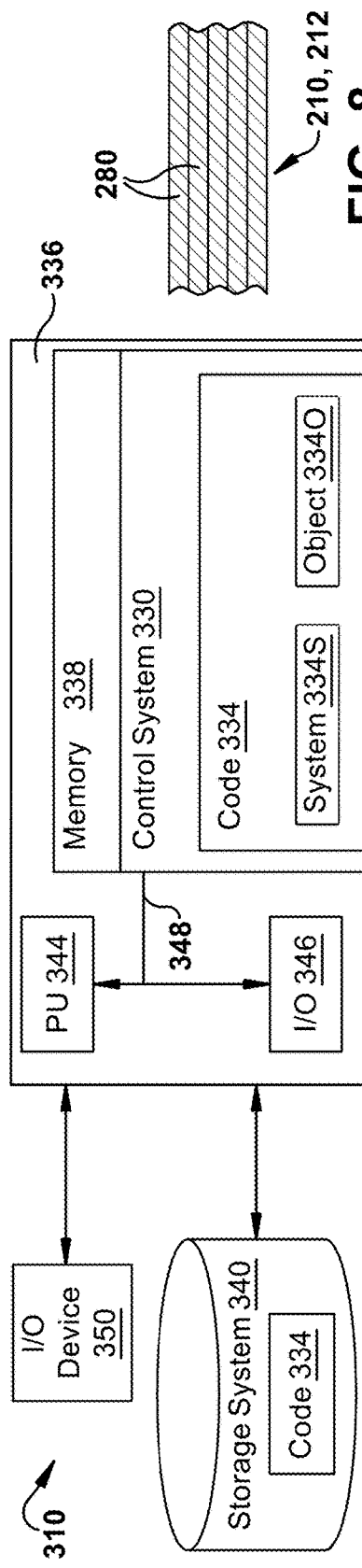
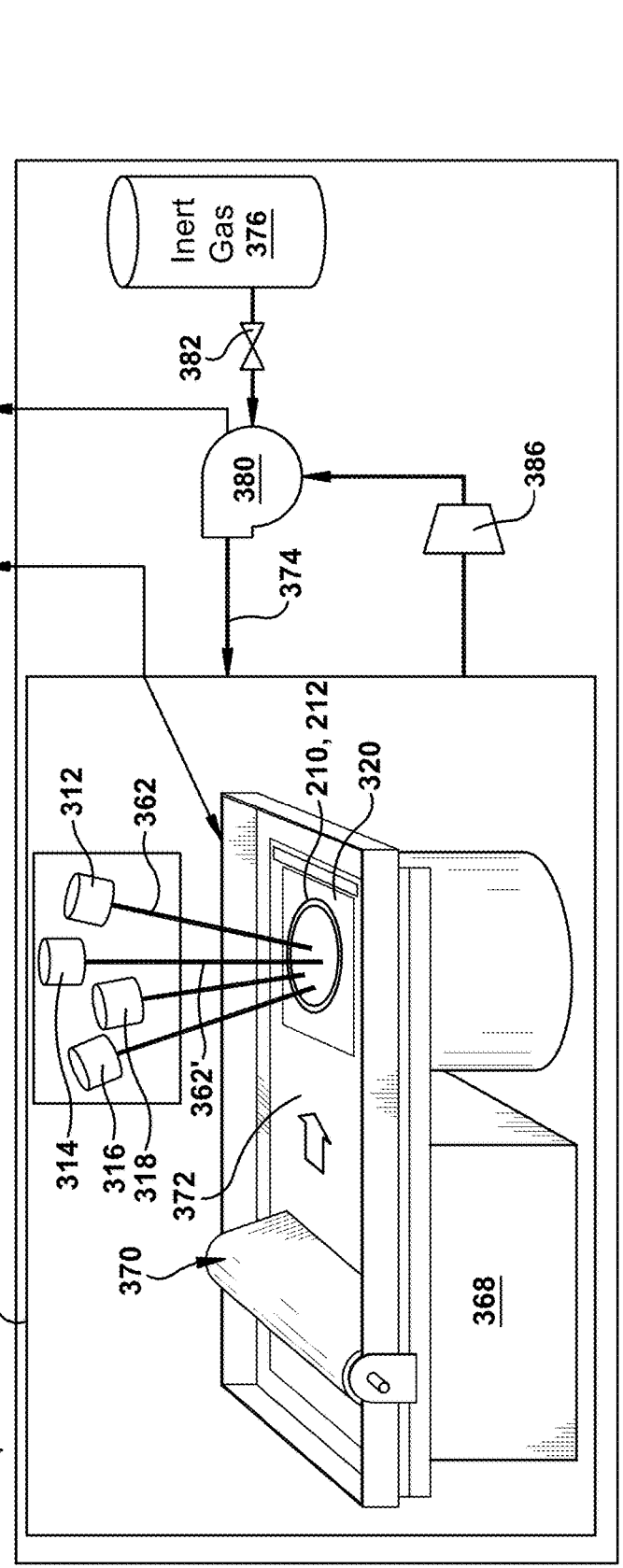

AXIAL FUEL STAGE INJECTOR WITH AXIALLY ELONGATED MIXING CHAMBERS WITH AXIALLY WAVY INLETS

TECHNICAL FIELD

The disclosure relates generally to turbomachine combustors and, more specifically, to an axial fuel stage (AFS) injector with axially elongated mixing chambers with axially wavy inlets, and a combustor and a gas turbine system including the same.

BACKGROUND

Gas turbine systems include a combustion section including a plurality of combustors in which fuel is combusted to create a flow of combustion gas that is converted to kinetic energy in a downstream turbine section. Current combustors include a head end fuel nozzle assembly for combusting fuel in a primary combustion zone and axial fuel stage (AFS) injectors for combusting fuel in a secondary combustion zone downstream of the primary combustion zone. Portions of an air supply, for example, from a compressor discharge casing, are delivered to the head end fuel nozzle assembly and the AFS injectors in various flow passages. Current AFS injectors present challenges relative to adequately mixing highly reactive fuels, like hydrogen, with air and to achieving desired low exhaust emissions and desired flame holding capability.

BRIEF DESCRIPTION

All aspects, examples and features mentioned below can be combined in any technically possible way.

A first aspect of the disclosure includes an axial fuel stage (AFS) injector for a combustor of a gas turbine (GT) system, the AFS injector comprising: a mixing member including: a plurality of axially elongated mixing chambers defined in the mixing member, each axially elongated mixing chamber including an outlet and an axially wavy inlet, wherein each outlet is configured to be in fluid communication with a combustion chamber of the combustor, and a set of fuel injectors defined in at least one wall of each axially elongated mixing chamber; a high pressure (HP) air injection member defining a set of HP air jets spaced from the axially wavy inlet of each axially elongated mixing chamber; and a fuel plenum defined in the mixing member, the fuel plenum configured to deliver fuel from a fuel source to each set of fuel injectors, wherein each set of HP air jets is configured to direct a HP air from a HP air source into the axially wavy inlet of a respective mixing chamber where fuel is injected by the set of fuel injectors.

Another aspect of the disclosure includes any of the preceding aspects, and the mixing member includes a first wall, a second wall, and a middle wall between the first wall and the second wall, and the plurality of mixing chambers includes a first axially elongated mixing chamber defined by the first wall and the middle wall and a second axially elongated mixing chamber defined by the second wall and the middle wall.

Another aspect of the disclosure includes any of the preceding aspects, and each set of HP air jets spaced from the axially wavy inlet of the plurality of axially extending mixing chambers includes a plurality of axially spaced slots defined through the HP air injection member.

Another aspect of the disclosure includes any of the preceding aspects, and the plurality of axially spaced slots in a selected set of HP air jets have different circumferential lengths.

Another aspect of the disclosure includes any of the preceding aspects, and the plurality of axially spaced slots in the selected set of HP air jets includes a repeating series of a long slot having a first end and a second end, a first shorter slot circumferentially overlapping the first end of the long slot, and a second shorter slot circumferentially overlapping the second end of the long slot, wherein the repeating series collectively has a wavy layout corresponding to a circumferential extent of the axially wavy inlet of a respective axially elongated mixing chamber.

Another aspect of the disclosure includes any of the preceding aspects, and the fuel plenum extends within an upstream portion of at least one wall of each of the axially elongated mixing chambers, wherein each set of fuel injectors is closer to the axially wavy inlet than the outlet of a respective axially elongated mixing chamber of the plurality of axially elongated mixing chambers.

Another aspect of the disclosure includes any of the preceding aspects, and each axially elongated mixing chamber extends radially relative to a circumference of a combustion liner of the combustor.

Another aspect of the disclosure includes any of the preceding aspects, and the set of HP air jets spaced from the axially wavy inlet of the plurality of axially elongated mixing chambers each include a radially inward extending collar having a first side thereof radially closer to the mixing member than a second, opposite side thereof.

Another aspect of the disclosure includes any of the preceding aspects, and the middle wall further includes: an HP air purge plenum defined therein; a plurality of HP air feed passages extending from the HP air purge plenum through a radially outer end of the middle wall adjacent the axially wavy inlet of the plurality of axially extending mixing chambers, wherein the plurality of HP air feed passages is in fluid communication with the HP air source; and at least one HP air purge opening extending from the HP air purge plenum through a trailing edge of the middle wall adjacent the outlet of the plurality of axially extending mixing chambers.

Another aspect of the disclosure includes any of the preceding aspects, and the mixing member and the HP air injection member each include at least one mounting element configured to receive a fastener to couple the mixing member and the HP air injection member to a combustion liner that defines the combustion chamber.

Another aspect of the disclosure includes any of the preceding aspects, and each set of HP air jets is configured to draw a low-pressure (LP) air from an LP air source to direct the LP air with the HP air into the inlet of each respective mixing chamber; the HP air source is in direct fluid communication with a compressor discharge of the GT system and the LP air source is in fluid communication with a cooling passage defined along at least a portion of the combustion liner; wherein the cooling passage is downstream of an impingement cooling member that is in direct fluid communication with the compressor discharge of the GT system.

Another aspect of the disclosure includes a combustor for a gas turbine system, the combustor comprising: a combustor body including a combustion liner; and a plurality of axial fuel stage (AFS) injectors directed into a combustion liner of the combustor, each AFS injector including: a mixing member including: a plurality of axially elongated mixing chambers defined in the mixing member, each axially elongated mixing chamber including an outlet and an axially wavy inlet, wherein each outlet is configured to be in fluid communication with a combustion chamber of the combustor, and a set of fuel injectors defined in at least one wall of each axially elongated mixing chamber; a high pressure (HP) air injection member defining a set of HP air jets spaced from the axially wavy inlet of each axially elongated mixing chamber; and a fuel plenum defined in the mixing member, the fuel plenum configured to deliver fuel from a fuel source to each set of fuel injectors, wherein each set of HP air jets is configured to direct a HP air from a HP air source and draw a low-pressure (LP) air from a LP air source to direct the LP air with the HP air into the axially wavy inlet of a respective mixing chamber where fuel is injected by the set of fuel injectors.

Another aspect of the disclosure includes any of the preceding aspects, and the mixing member includes a first wall, a second wall and a middle wall between the first wall and the second wall, and the plurality of mixing chambers includes a first axially elongated mixing chamber defined by the first wall and the middle wall and a second axially elongated mixing chamber defined by the second wall and the middle wall.

Another aspect of the disclosure includes any of the preceding aspects, and each set of HP air jets spaced from the axially wavy inlets of the plurality of axially extending mixing chambers includes a plurality of axially spaced slots defined through the HP air injection member.

Another aspect of the disclosure includes any of the preceding aspects, and the plurality of axially spaced slots in each set of HP air jets include a repeating series of a long slot having a first end and a second end, a first shorter slot circumferentially overlapping the first end of the long slot, and a second shorter slot circumferentially overlapping the second end of the long slot, wherein the repeating series collectively has a wavy layout corresponding to a circumferential extent of the axially wavy inlet of a respective axially elongated mixing chamber.

Another aspect of the disclosure includes any of the preceding aspects, and the fuel plenum extends within an upstream portion of at least one wall of each of the axially elongated mixing chambers, wherein each set of fuel injectors is closer to the axially wavy inlet than the outlet of a respective axially elongated mixing chamber of the plurality of axially elongated mixing chambers.

Another aspect of the disclosure includes any of the preceding aspects, and the middle wall further includes: an HP air purge plenum defined therein; a plurality of HP air feed passages extending from the HP air purge plenum through a radially outer end of the middle wall adjacent the axially wavy inlet of the plurality of axially extending mixing chambers, wherein the plurality of HP air feed passages is in fluid communication with the HP air source; and at least one HP air purge opening extending from the HP air purge plenum through a trailing edge of the middle wall adjacent the outlet of the plurality of axially extending mixing chambers.

Another aspect of the disclosure includes any of the preceding aspects, and the mixing member and the HP air injection member each include at least one mounting element configured to receive a fastener to couple the mixing member and the HP air injection member to a combustion liner that defines the combustion chamber.

Another aspect of the disclosure includes any of the preceding aspects, and each set of HP air jets is configured to draw a low-pressure (LP) air from an LP air source to direct the LP air with the HP air into the inlet of each respective mixing chamber; the HP air source is in direct fluid communication with a compressor discharge of the GT system and the LP air source is in fluid communication with a cooling passage defined along at least a portion of the combustion liner; wherein the cooling passage is downstream of an impingement cooling member that is in direct fluid communication with the compressor discharge of the GT system.

Another aspect of the disclosure includes a gas turbine (GT) system, comprising: a compressor section; a combustion section operatively coupled to the compressor section; and a turbine section operatively coupled to the combustion section, wherein the combustion section includes at least one combustor including: a combustor body including a combustion liner; a head end fuel nozzle assembly at a forward end of the combustor body; and a plurality of axial fuel stage (AFS) injectors directed into the combustor body downstream of the head end fuel nozzle assembly, each AFS injector including: a mixing member including: a plurality of axially elongated mixing chambers defined in the mixing member, each axially elongated mixing chamber including an outlet and an axially wavy inlet, wherein each outlet is configured to be in fluid communication with a combustion chamber of the combustor, and a set of fuel injectors defined in at least one wall of each axially elongated mixing chamber; a high pressure (HP) air injection member defining a set of HP air jets spaced from the axially wavy inlet of each axially elongated mixing chamber; and a fuel plenum defined in the mixing member, the fuel plenum configured to deliver fuel from a fuel source to each set of fuel injectors, wherein each set of HP air jets is configured to direct a HP air from a HP air source into the axially wavy inlet of a respective mixing chamber where fuel is injected by the fuel injectors.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 6D shows a schematic view of opposing side walls of a mixing chamber of a mixing member of an AFS injector according to embodiments of the disclosure;

FIG. 6E shows a schematic view of opposing side walls of a mixing chamber of a mixing member of an AFS injector according to other embodiments of the disclosure;

FIG. 7B shows an enlarged top-down view of a set of high-pressure air jets in a high-pressure air injection member in FIG. 7A;

FIG. 7C shows a cross-sectional view along view line 7C-7C in FIG. 7A;

FIG. 8 shows a cross-sectional view of a plurality of parallel, sintered metal layers of a mixing member or a high-pressure air injection member of an AFS injector according to embodiments of the disclosure; and FIG. 9 shows a schematic block diagram of an illustrative additive manufacturing system for additively manufacturing a mixing member and/or a high-pressure air injection member of an AFS injector according to embodiments of the disclosure.

Figure 1:
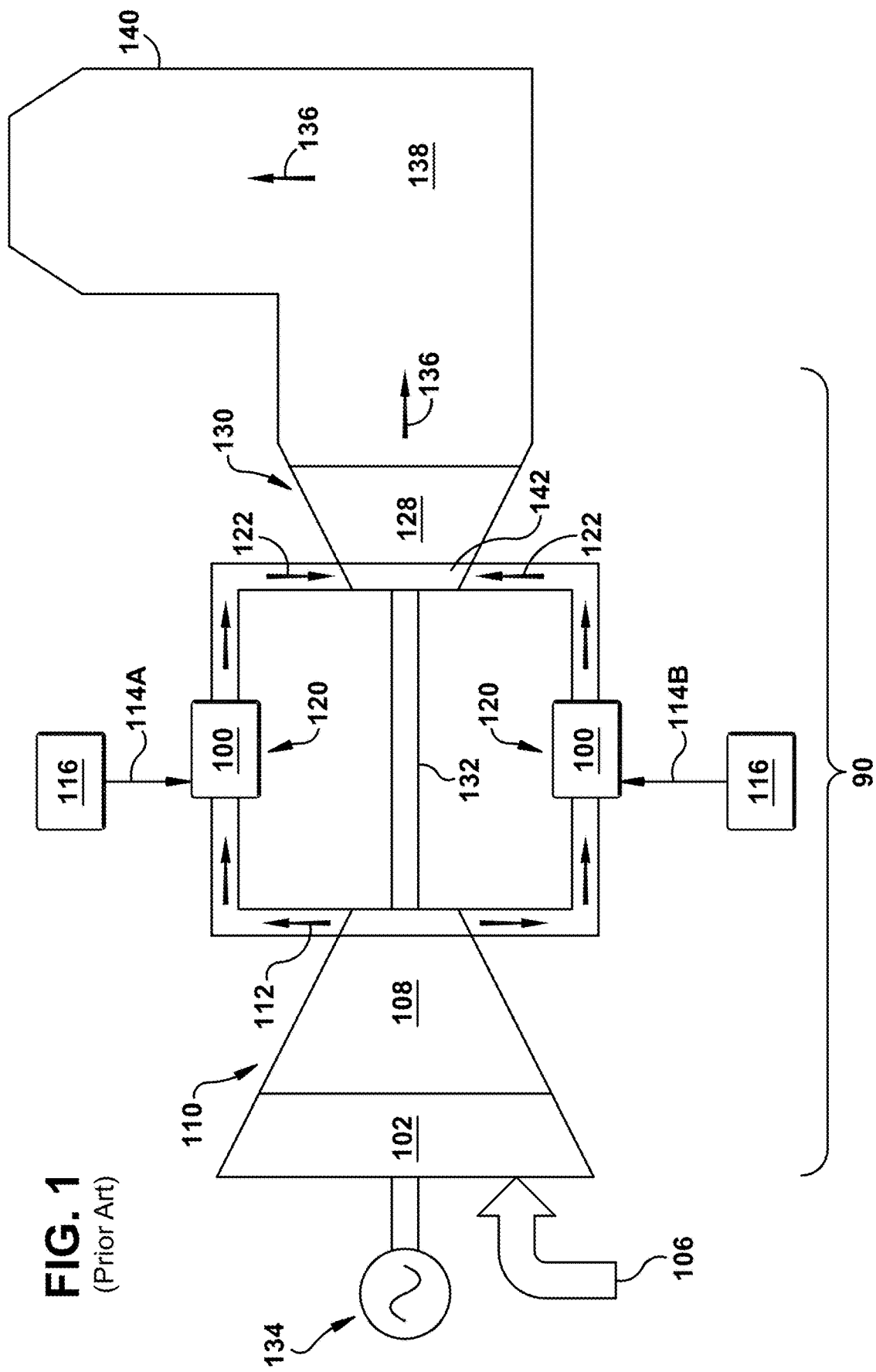
FIG. 1 shows a functional block diagram of an illustrative gas turbine system capable of use with a combustor including an axial fuel stage (AFS) injector according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current technology, it will become necessary to select certain terminology when referring to and describing relevant machine components within the illustrative application of a turbomachine combustor and axial fuel stage (AFS) injector. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through a combustor of the turbomachine or, for example, the flow of air through the combustor or AFS injector, or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the turbomachine or combustor, and "aft" referring to the rearward or turbine end of the turbomachine or combustor.

The term "axial" refers to movement or position parallel to an axis, e.g., an axis of a combustor, a mixing chamber of the AFS injector, or turbomachine. The term "radial" refers to movement or position perpendicular to an axis, e.g., an axis of a combustor or a turbomachine. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. Finally, the term "circumferential" refers to movement or position around an axis, e.g., a circumferential interior surface of a combustor body or a circumferential interior of casing extending about a combustor. As indicated above and depending on context, it will be appreciated that such terms may be applied in relation to the axis of the combustor or the axis of the turbomachine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs, or the feature is present and instances where the event does not occur, or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

Embodiments of the disclosure provide an axial fuel stage (AFS) injector for a combustor, the combustor, and a gas turbine (GT) system including the same. The AFS injector includes a mixing member including a plurality of axially elongated mixing chambers. In certain embodiments, the mixing member includes a first wall, a second wall, and a middle wall between the first wall and the second wall, such that a first axially elongated mixing chamber is defined by the first wall and the middle wall, and a second axially elongated mixing chamber is defined by the second wall and the middle wall. Each axially elongated mixing chamber includes an outlet and an axially wavy inlet, and each outlet is configured to be in fluid communication with a combustion chamber of the combustor. A set of fuel injectors is defined in a side wall of each axially elongated mixing chamber, e.g., in the axially wavy inlet. A high-pressure (HP) air injection member defines a set of HP air jets spaced from the axially wavy inlet of each axially elongated mixing chamber. A fuel plenum is defined in the mixing member to deliver fuel from a fuel source to each set of fuel injectors. Each set of the HP air jets is configured to direct a HP air from a HP air source and, in some embodiments, to draw a low-pressure (LP) air from a LP air source to direct the LP air with the HP air into the axially wavy inlet of the respective axially elongated mixing chamber where fuel is injected by the set of fuel injectors. The axially elongated mixing chambers direct the air-fuel mixture into the combustion liner for combustion in a secondary combustion zone thereof.

In some embodiments, the AFS injector mixes two sources of air, one being high-pressure air, e.g., from a compressor discharge, and the other a low-pressure air, e.g., post-impingement cooling air, to reduce overall system pressure loss and to use air more efficiently in the combustor. The AFS injector can rapidly premix the two air sources with, for example, highly reactive fuels, like hydrogen, to achieve low emissions, e.g., of nitrous oxide (NOx), and an acceptable flame holding capability.

In each embodiment, the AFS injector achieves high mixedness of fuel and air, minimizes flow-pressure loss, and prevents fuel from entering any low velocity air flow zones. The axially wavy inlets provide narrower chambers than just straight slots and provide lower pressure loss and easier introduction of fuel and LP air, when used, into the mixing chambers. Additionally, the AFS injector is packaged in a relatively small geometry, allowing it to be assembled onto the combustion liner of a combustor body, and the combustor body installed into the GT system through the relatively small opening in a compressor discharge casing. The AFS injector may be additively manufactured to include a plurality of parallel, sintered metal layers.

FIG. 1 shows a functional block diagram of an illustrative gas turbine (GT) system 90 that may incorporate various embodiments of a combustor 100 and axial fuel stage (AFS) injectors 150 (FIG. 2) of the present disclosure. As shown, GT system 90 generally includes an inlet section 102 that may include a series of filters, cooling coils, moisture separators, and/or other devices to purify and otherwise condition a working fluid (e.g., air) 104 entering GT system 90. Working fluid 106, i.e., air, flows to a compressor 108 in a compressor section 110 that progressively imparts kinetic energy to working fluid 106 to produce a compressed, high-pressure (HP) air 112 (hereafter "HP air 112" or "compressed air 112") at a highly energized state. HP air 112 is typically mixed with a fuel 114A and/or 114B from a fuel source 116 to form a combustible mixture within at least one combustor 100 in a combustion section 120 that is operatively coupled to compressor section 110. The combustible mixture is burned to produce combustion gases 122 having a high temperature and pressure.

Combustion gases 122 flow through a turbine 128 of a turbine section 130 operatively coupled to combustion section 120 to produce work. For example, turbine 128 may be connected to a shaft 132 so that rotation of turbine 128 drives compressor 108 to produce HP air 112. Alternately, or in addition, shaft 132 may connect turbine 128 to another load, such as a generator 134 for producing electricity. Exhaust gases 136 from turbine 128 flow through an exhaust section 138 that connects turbine 128 to an exhaust stack 140 downstream from turbine 128. Exhaust section 138 may include, for example, a heat recovery steam generator (not shown) for cleaning and extracting additional heat from exhaust gases 136 prior to release to the environment. Where more than one combustor 100 is used, they may be circumferentially spaced around a turbine inlet 142 of turbine 128.

In one embodiment, GT system 90 may include a current engine model commercially available from GE Vernova of Cambridge, MA. The present disclosure is not limited to any one particular GT system and may be implemented in connection with other engines including, for example, any HA, F, B, LM, GT, TM and E-class engine models of GE Vernova, and engine models of other companies. Furthermore, the present disclosure is not limited to any particular turbomachine, and may be applicable to, for example, steam turbines, jet engines, compressors, turbofans, etc.

Figure 2:
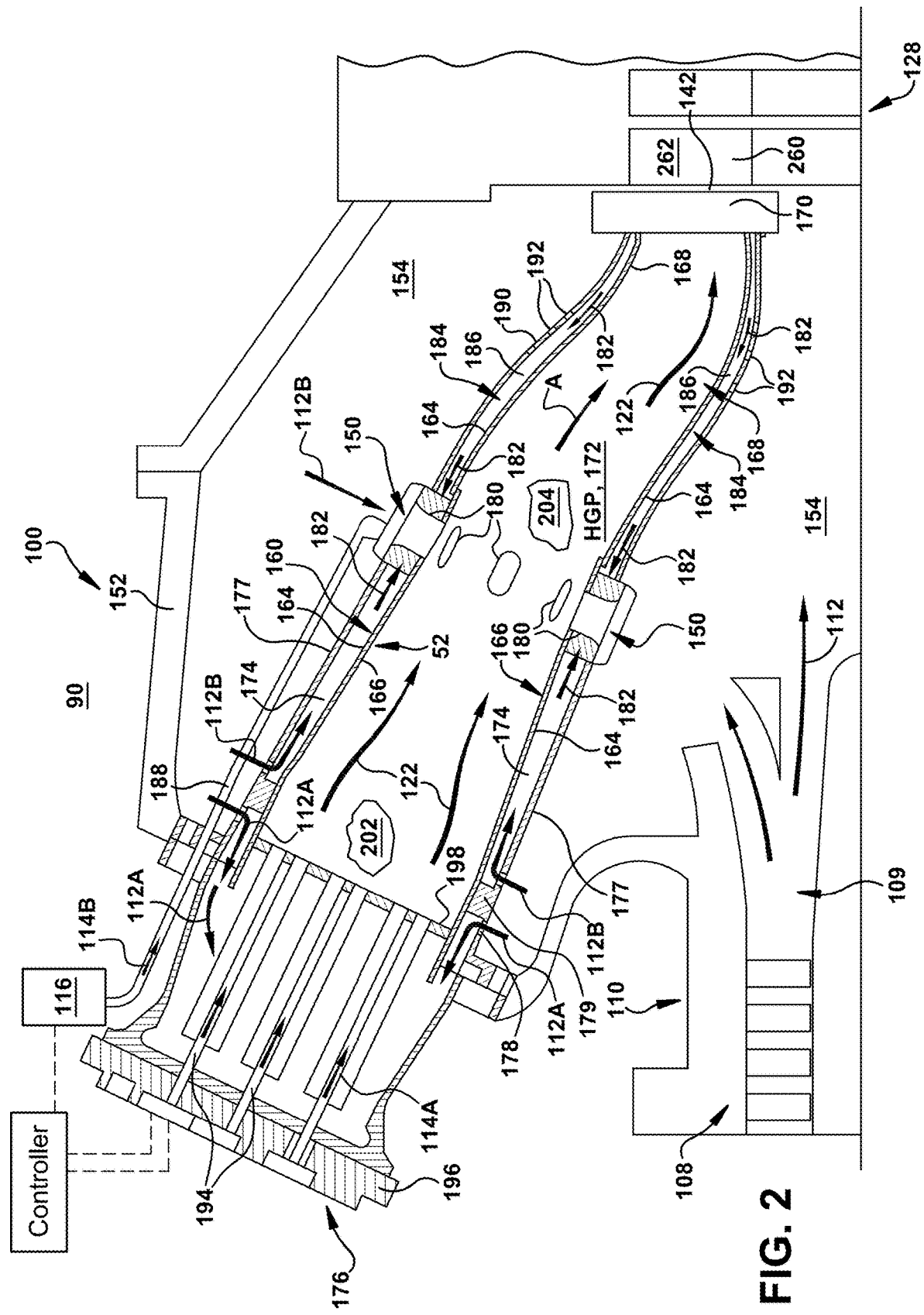
FIG. 2 shows a cross-sectional side view of a combustor including an AFS injector according to embodiments of the disclosure.

A combustor 100 usable within GT system 90 will now be described. FIG. 2 shows a cross-sectional side view of combustor 100 positioned within GT system 90. As will be further described herein, combustor 100 may include one or more axial fuel stage (AFS) injectors 150 according to embodiments of the disclosure.

As shown in FIG. 2, combustor 100 is at least partially surrounded by an outer casing 152 such as a compressor discharge casing and/or a turbine casing. An interior of outer casing 152 is in fluid communication with a compressor discharge 109 of compressor 108 and creates an HP air source 154. That is, HP air source 154 includes HP air 112 from compressor discharge of compressor 108. HP source 154 is in direct fluid communication with compressor discharge 109 of GT system 90. However, HP air source 154 may be any supply of HP air 112 capable of flowing into any variety of openings or flow passages in combustor 100 to cool parts and/or for combustion, i.e., in AFS injectors 150.

As shown in FIG. 2, combustor 100 for GT system 90 includes a combustor body 160. Combustor body 160 may be made using any now known or later developed techniques. For example, combustor body 160 may be additively manufactured. Combustor body 160 may include a combustion liner 164, which may include, for example, a cylindrical portion 166 and a tapered transition portion 168. Combustion liner 164 may have an axis A, the direction of which may vary slightly depending on axial location within the curved combustion liner 164. Tapered transition portion 168 is at an aft end (right side as shown in FIG. 2) of cylindrical portion 166. As understood in the field, tapered transition portion 168 transitions the hot gas path (HGP) from the circular cross-section of the liner's cylindrical portion 166 to a more arcuate cross-section for mating with turbine inlet 142 of turbine 128. Combustor 100 may also include an aft frame 170 at an aft end (right side in FIG. 2) of tapered transition portion 168.

Combustion liner 164 may contain and convey combustion gases 122 to turbine section 130 (FIG. 1). More particularly, combustion liner 164 defines a combustion chamber 172, i.e., in a hot gas path (HGP), within which combustion occurs. Combustion liner 164 may have tapered transition portion 168 that is separate from cylindrical portion 166, as in many conventional combustion systems. Alternatively, as shown in FIG. 2, combustion liner 164 may have a unified body (or "unibody") construction, in which cylindrical portion 166 and tapered transition portion 168 are integrated with one another, i.e., as part of an additively manufactured one-piece member. Thus, any discussion of combustion liner 164 herein is intended to encompass both conventional combustion systems having a separate cylindrical and tapered transition portions and those combustion systems having a unibody liner.

Combustor body 160 also includes an air flow passage 174 defined at least partially by cylindrical portion 166 of combustion liner 164. As will be described herein, air flow passage 174 is configured to deliver air (e.g., HP air 112A from HP air source 154) to a head end fuel nozzle assembly 176 (hereinafter "head end assembly 176" for brevity) of combustor 100 at a forward end (left end in FIG. 2) of combustion liner 164. That is, it is sized, shaped and/or arranged to deliver air, such as HP air 112A from HP air source 154, to head end assembly 176 of combustor 100. Air flow passage 174 may be defined wholly within cylindrical portion 166, or air flow passage 174 may be provided between cylindrical portion 166 and a flow sleeve 177 spaced along at least a portion of an exterior surface of cylindrical portion 166. Air flow passage 174 has an open end 178, or air flow opening(s), proximate to head end assembly 176 through which HP air 112A from HP air source 154 enters. Here, HP air 112A from HP air source 154 may be pulled directly from compressor discharge, i.e., without any other use of the air other than coincidental convection cooling of combustor body 160.

An annular partition 179 disposed between cylindrical portion 166 and flow sleeve 177 separates a forward portion of air flow passage 174 from an aft portion of air flow passage 174. The axial position of annular partition 179 is approximately aligned with a cap assembly 198, discussed below, such that the forward portion of air flow passage 174 is radially outward of head end assembly 176 (rather than combustion chamber 172) and, therefore, requires less cooling. Aftward of annular partition 179, flow sleeve 177 may include a plurality of impingement holes 192 (as shown in outer sleeve 190), which permit HP air 112B to flow into air flow passage 174. As a result of passing through impingement holes 192, HP air 112B experiences a pressure drop and becomes LP air 182, which flows through air flow passage 174 toward and/or into AFS injector(s) 150, as discussed further herein.

Head end assembly 176 generally includes at least one axially extending fuel nozzle 194 that extends downstream from an end cover 196 and a cap assembly 198 that extends radially and axially within outer casing 152 downstream from end cover 196, which defines the forward boundary of combustion chamber 172. Head end assembly 176 may include any now known or later developed axially extending fuel nozzles 194 for delivering first fuel 114A to a primary combustion zone 202 from axially extending fuel nozzles 194. In certain embodiments, axially extending fuel nozzle(s) 194 of head end assembly 176 extend at least partially through cap assembly 198 to provide a combustible mixture of fuel 114A and HP air 112A to primary combustion zone 202.

Combustor body 160 also includes an axial fuel stage (AFS) injector opening or seat 180 directed into combustion liner 164 downstream of head end assembly 176. Opening or seat 180 extends through a wall of combustion liner 164. One or more AFS injector openings or seats 180 (hereafter "openings 180") can be provided and are configured to have an AFS injector 150 mounted thereto and receive HP air 112B from HP air source 154, possibly among other air flow(s) as will be described herein. Each AFS injector opening 180 may include any necessary structure to allow an AFS injector 150 to be mounted thereto, e.g., threaded fasteners, bolt holes, weld area, etc. As illustrated, combustor 100 and combustor body 160 may include a plurality of circumferentially spaced AFS injector openings 180 and corresponding AFS injectors 150. Any number of AFS injectors 150 can be used.

As will be described, in some embodiments, AFS injector(s) 150 may also be configured to receive (draw in) a low-pressure (LP) air 182 from a low-pressure (LP) air source 184, e.g., cooling passage, and direct it into combustion liner 164 with fuel 114B. Fuel 114B may be delivered from fuel source 116 using any form of fuel line(s) 188. Fuel 114A, 114B may be any now known or later developed combustor 100 fuels, such as but not limited to fuel oil, natural gas, hydrogen, and/or blends thereof. Fuels 114A, 114B may be the same or different.

In some embodiments, LP air 182 can be delivered to AFS injector(s) 150 in a variety of ways from LP air source 184. In certain embodiments, LP air 182 originates from HP air source 154 but is used for cooling prior to use in AFS injector(s) 150. In one example, combustor body 160 further includes a cooling passage(s) 186 at least partially defined by tapered transition portion 168. In this setting, cooling passage(s) 186 constitute LP air source 184. Cooling passage(s) 186 may also be in fluid communication with other cooling passages (not shown) in combustor 100, e.g., in an aft frame 170. In any event, LP air 182 of LP air source 184 may be used for cooling one or more hot parts of combustor 100. More particularly, LP air 182 of LP air source 184 passes through cooling passage(s) 186, which as noted may be at least partially defined by tapered transition portion 168, after being pulled from compressor discharge 109.

In one example, cooling passage(s) 186 may be formed by a flow sleeve 190 or within tapered transition portion 168. Where desired, impingement cooling holes 192 may be provided in flow sleeve 190 surrounding tapered transition portion 168 to allow HP air 112 to enter from HP air source 154 and become LP air 182. In this regard, LP air source 184 includes cooling passage(s) 186 defined along at least a portion of combustion liner 164, e.g., tapered transition portion 168, and any upstream cooling passages in other hot parts of combustor 100. Further, cooling passage(s) 186 may be downstream of an impingement cooling member (flow sleeve 177 and/or portion 168 with impingement cooling holes 192 in outer sleeve thereof or sleeve 190 around portion 168 with holes 192 therein), which is in direct fluid communication with compressor discharge 109 of GT system 90, i.e., HP air source 154. It is noted that the hot part(s) may include any part of combustor 100 requiring cooling, and LP air 182 may be directed to enter cooling passage(s) 186 in any manner desired. That is, cooling passage(s) 186 may be defined in or along (other) hot part(s) of combustor 100 other than tapered transition portion 168, e.g., aft frame 170. In any event, cooling passage(s) 186 is/are between AFS injector(s) 150 and HP air source 154 with the cooling passage(s) 186, in some embodiments, being configured to deliver LP air 182 of LP air source 184 to AFS injector(s) 150 for mixing with fuel. LP air 182 from LP air source 184 may also be referred to herein as a "post-cooling" or "post-impingement air" since it is used to provide significant cooling of parts of combustor 100.

As noted, combustor 100 includes at least one axial fuel stage (AFS) injector 150 directed into combustor body 160, i.e., combustion liner 164. As noted, AFS injector(s) 150 may include a plurality of AFS injectors 150 circumferentially spaced around combustor body 160. Each AFS injector 150 extends radially through combustion liner 164 in an opening 180 downstream from head end assembly 176, i.e., downstream from axially extending fuel nozzle(s) 194. As will be further described, AFS injectors 150 are configured to receive HP air 112B of HP air source 154 and, optionally, to draw in LP air 182 from LP air source 184. In particular embodiments, LP air 182 of LP air source 184 may be routed to AFS injector(s) 150, e.g., in cooling passage(s) 186, to combine with HP air 112B and second fuel 114B for combustion in a secondary combustion zone 204 that is downstream from primary combustion zone 202.

Figure 3:
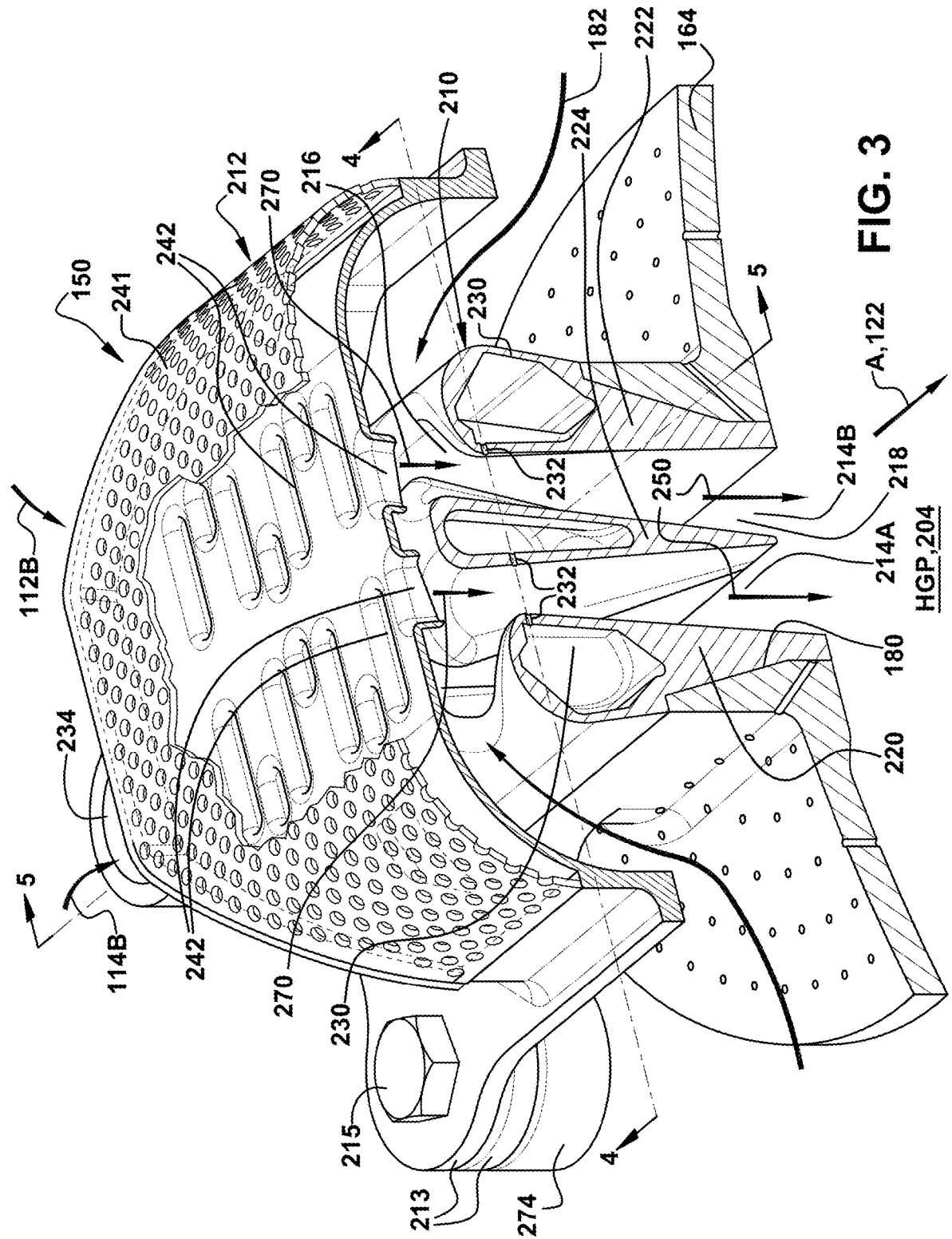
FIG. 3 shows a perspective and partial cross-sectional view of an AFS injector according to embodiments of the disclosure.
Figure 4:
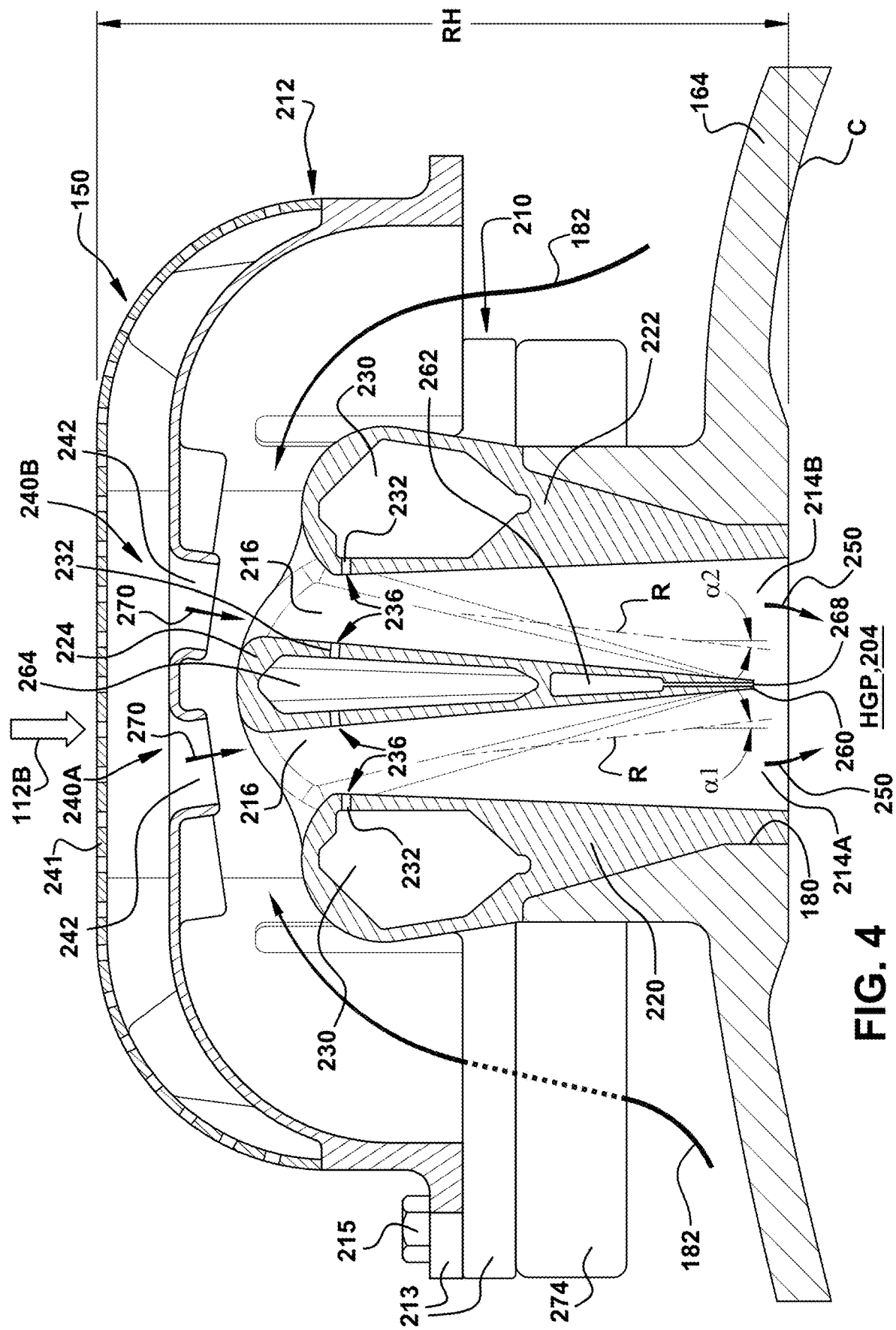
FIG. 4 shows a cross-sectional view of an AFS injector along view line 4-4 in FIG. 3 according to embodiments of the disclosure.
Figure 5:
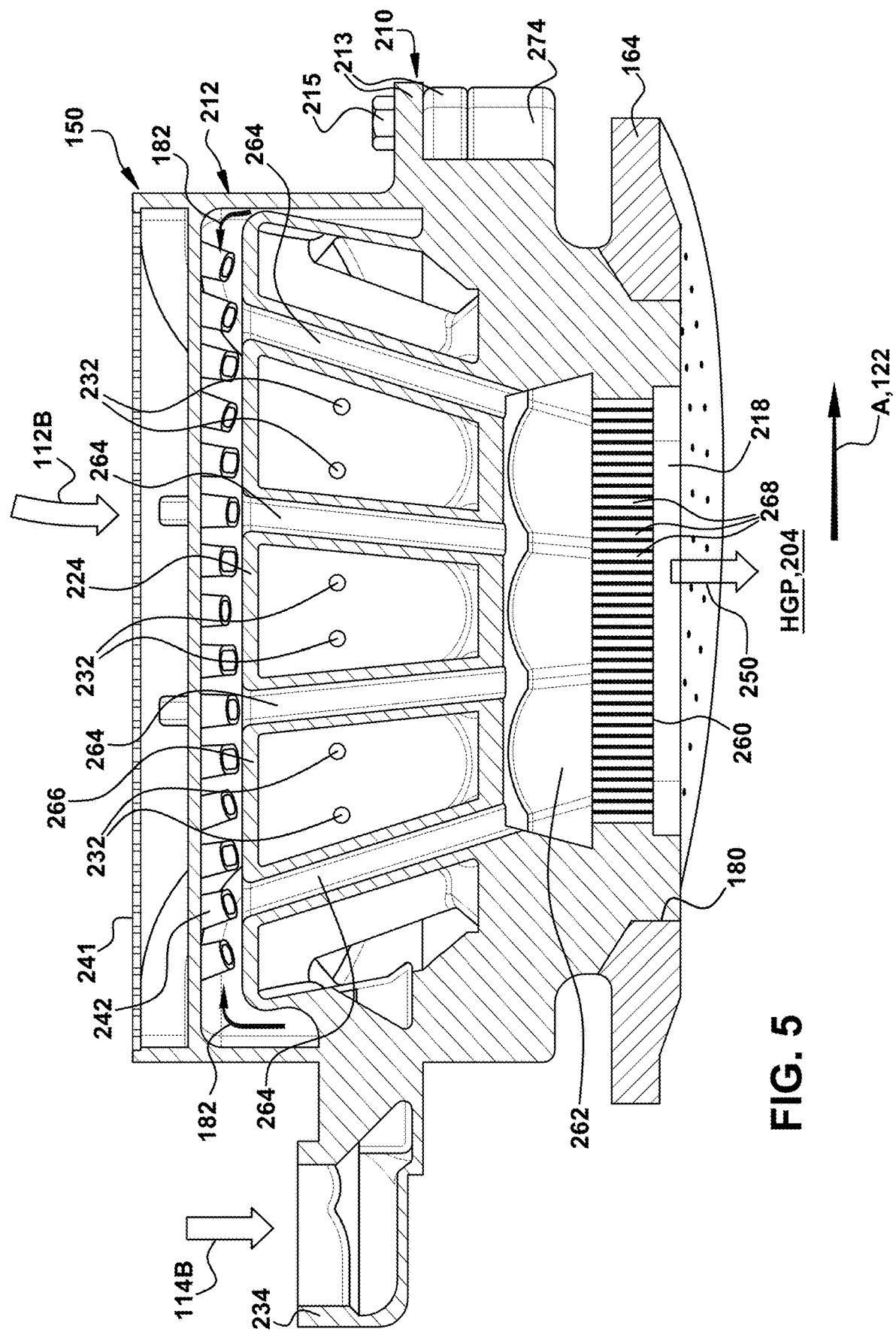
FIG. 5 shows a cross-sectional view of an AFS injector along view line 5-5 in FIG. 3 according to embodiments of the disclosure.
Figure 6A:
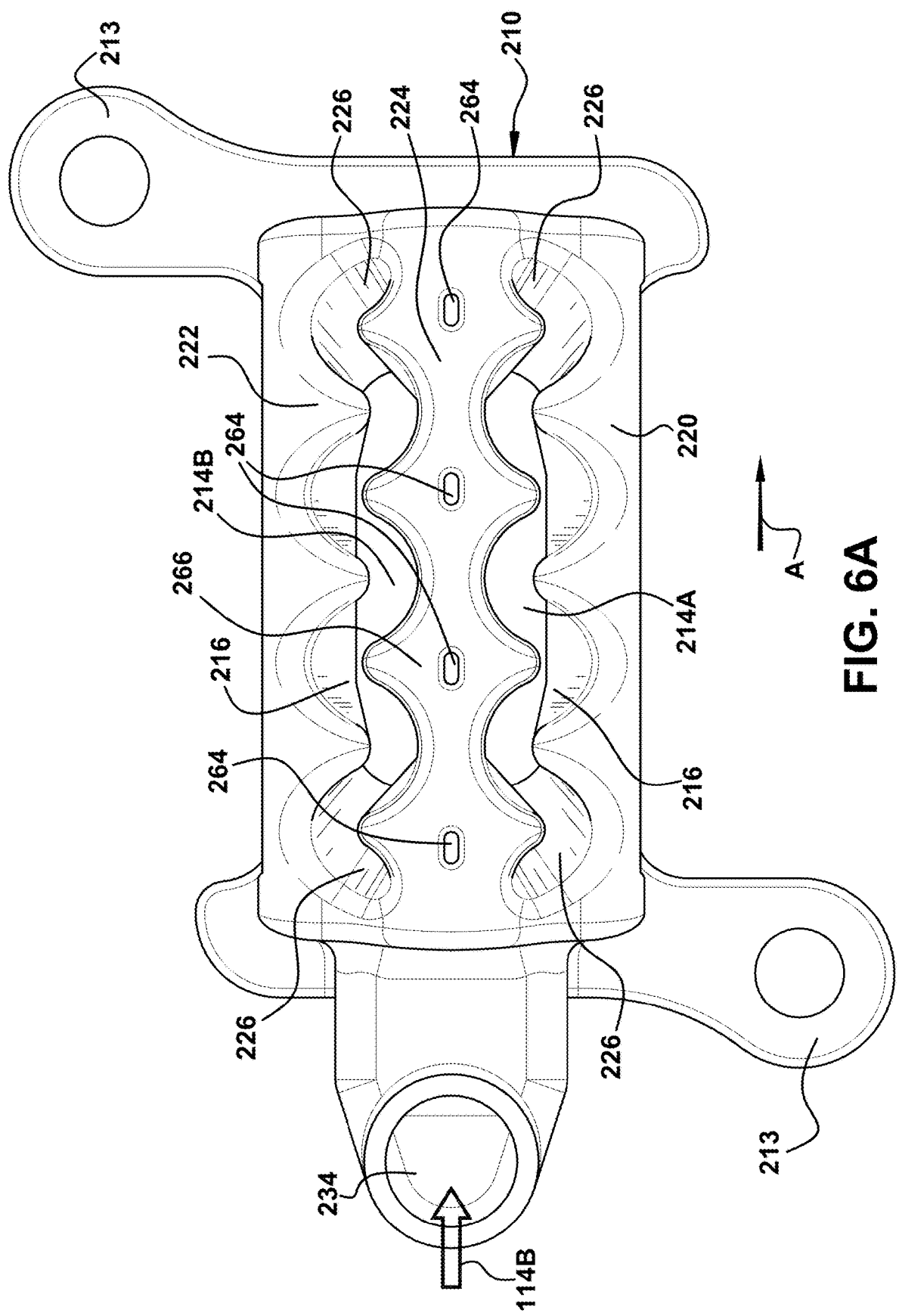
FIGS. 6A and 6C show top-down views of a mixing member of an AFS injector according to various embodiments of the disclosure.
Figure 6B:
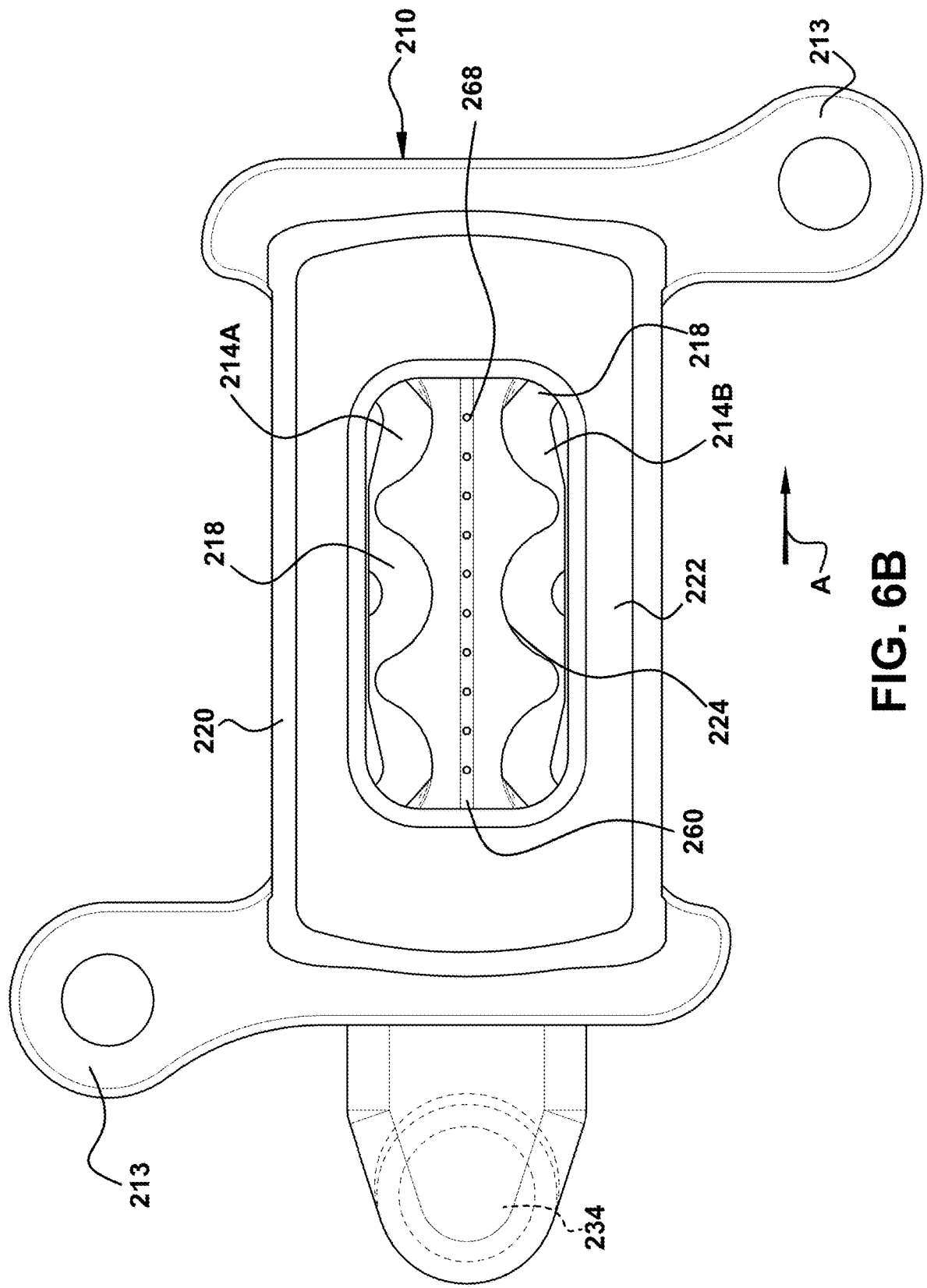
FIG. 6B shows a bottom-up view of the mixing member of the AFS injector in FIG. 6A.
Figure 6C:
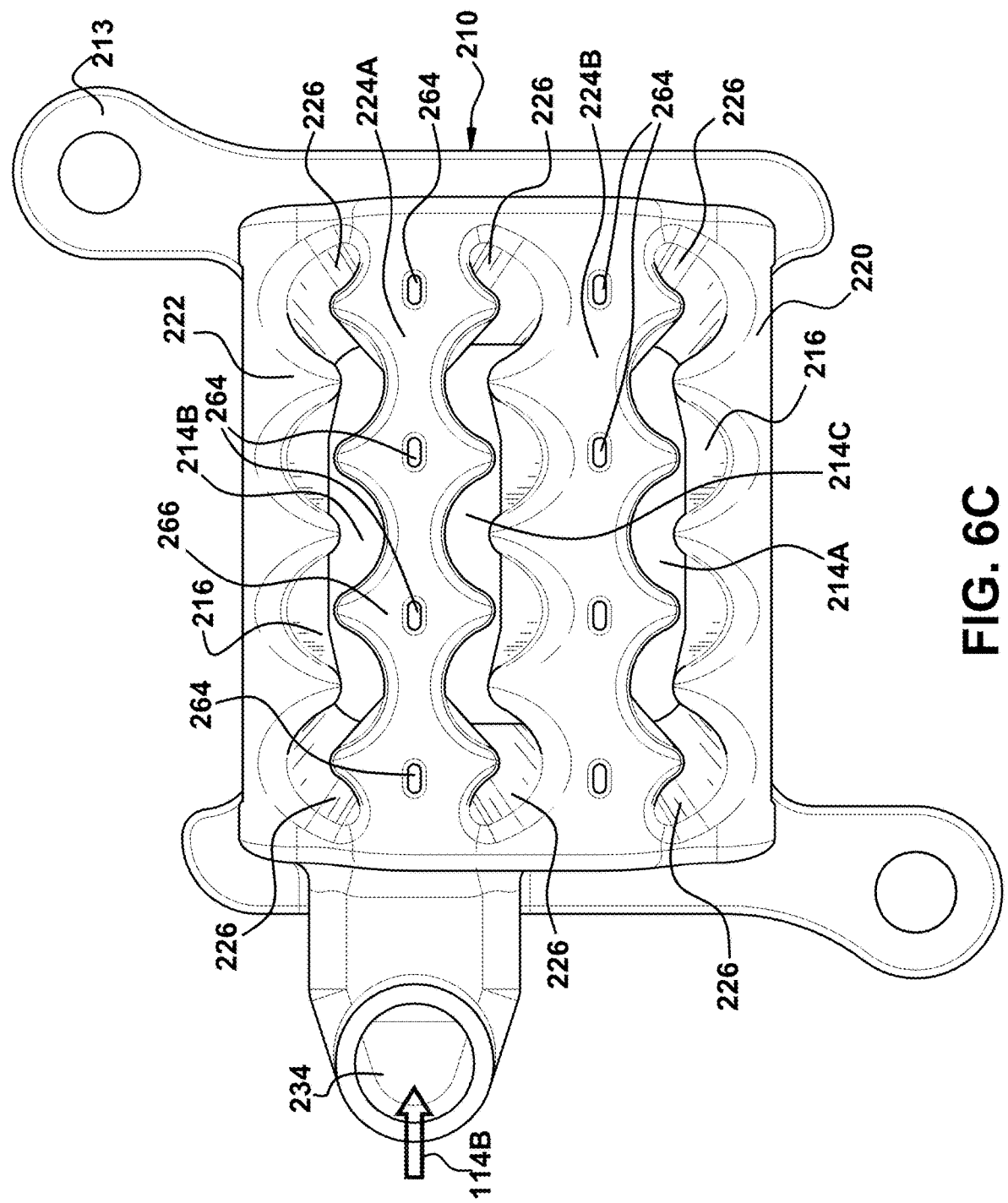
Figure 7A:
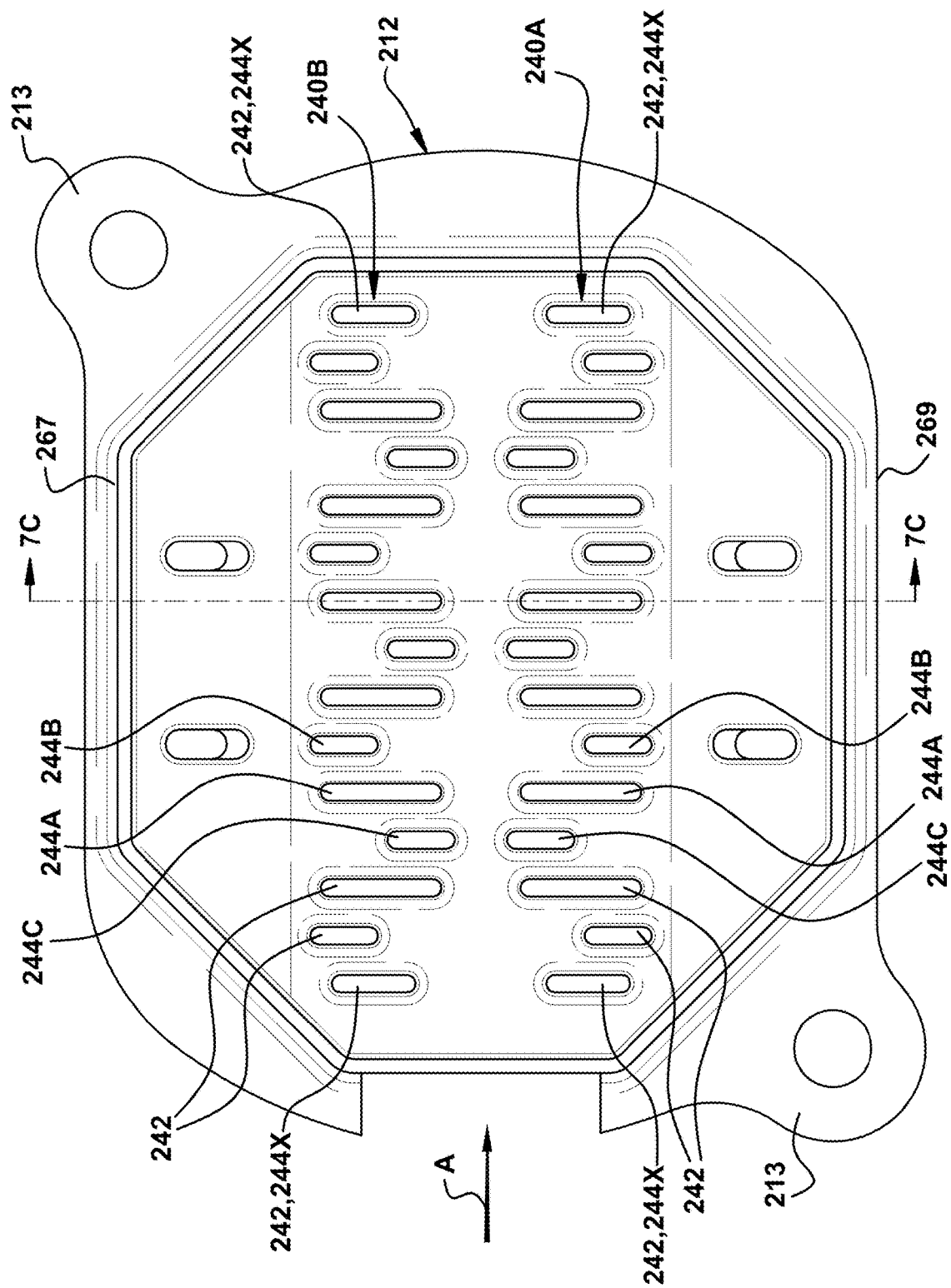
FIG. 7A shows a top-down view of a high-pressure air injection member of an AFS injector according to embodiments of the disclosure.

FIGS. 3-5 show various views of AFS injector 150 according to embodiments of the disclosure. FIG. 3 shows a perspective and partial cross-sectional view of AFS injector 150; FIG. 4 shows a cross-sectional view along view line 4-4 and FIG. 3; and FIG. 5 shows a cross-sectional view along view line 5-5 in FIG. 3. AFS injector 150 includes a mixing member 210 and a high pressure (HP) air injection member 212. Top-down views of mixing member 210 according to various embodiments are shown in FIGS. 6A and 6C, a bottom-up view of mixing member 210 in FIG. 6A is shown in FIG. 6B, and a top-down view of HP air injection member 212 according to various embodiments is shown in FIG. 7A.

Mixing member 210 and HP air injection member 212 are coupled together to form AFS injector 150. More particularly, as shown in FIGS. 3-5, mixing member 210 and HP air injection member 212 may each include a mounting element 213 configured to receive a fastener 215 (e.g., bolt, weld or other fastener) to couple mixing member 210 and HP air injection member 212 to combustor body 160, e.g., to AFS injector mounts 274 coupled to outer sleeve 190. Alternatively, mixing member 210 and HP air injection member 212 may be formed as a single, integrated piece, e.g., by additive manufacturing. Each AFS injector 150 is aligned with, and installed within, a respective opening 180 in combustion liner 164. Hereafter, HP air injection member 212 is sometimes referred to as "injection member 212" for brevity.

As shown in FIGS. 3-4 and 6A-B, mixing member 210 includes a plurality of axially elongated mixing chambers 214 (e.g., mixing chambers 214A, 214B) defined therein. Mixing member 210 may also be referred to as an injector body. Each axially elongated mixing chamber 214 includes an axially wavy inlet 216 and an outlet 218. Each axially wavy inlet 216 is radially inward of HP air injection member 212, and outlet 218 is configured to be in fluid communication with combustion liner 164 of combustor 100 (FIG. 2).

Axially wavy inlets 216 are referred to as "axial" because the longitudinal length thereof, e.g., of the wavy slots, may be generally aligned with an axis A of combustion liner 164. Axially wavy inlets 216 are referred to as "wavy" because the longitudinal length smoothly curves between peaks and valleys, creating a wavy or somewhat sinusoidal axial path. The wavy configuration allows for a narrow passage of shorter length in axially wavy inlet 216 than a straight slot would provide for a given cross sectional passage area, e.g., as in outlet 218. Each axially wavy inlet 216 may extend any radial extent of mixing chambers 214 before transitioning to a respective non-wavy outlet 218. Outlets 218 may be defined by mixing member 210 have any cross-sectional shapes. In the example, as shown in FIG. 6B, outlets 218 have axially elongated slot cross-sectional shapes. In any event, mixing member 210 at outlets 218 may be positioned and fixed in opening 180 in combustion liner 164.

In certain embodiments, shown in FIGS. 3-4 and 6A, mixing member 210 includes a first wall 220, a second wall 222 and a middle wall 224 between first wall 220 and second wall 222. A first axially elongated mixing chamber 214A is defined by first wall 220 and middle wall 224, and a second axially elongated mixing chamber 214B is defined by second wall 222 and middle wall 224. Hence, in the example shown, plurality of axially elongated mixing chambers 214 include first axially elongated mixing chamber 214A and second axially elongated mixing chamber 214B.

While mixing member 210 is shown with two axially elongated mixing chambers 214A-B in FIGS. 6A-B, more than two axially elongated mixing chambers 214 can be provided by providing more walls. For example, FIG. 6C shows mixing member 210 including first wall 220, second wall 222 and two middle walls 224A, 224B between first wall 220 and second wall 222. Here, another, third axially elongated mixing chamber 214C is defined between middle walls 224A, 224B. Hence, in the example shown in FIG. 6C, plurality of axially elongated mixing chambers 214 include first axially elongated mixing chamber 214A, second axially elongated mixing chamber 214B, and third axially elongated mixing chamber 214C. Mixing chamber 214C may be otherwise identical to mixing chambers 214A-B, as described herein.

Axially elongated mixing chambers 214 may take a variety of forms. More particularly, as shown in FIGS. 3 and 6A-C, each axially elongated mixing chamber 214 has generally elongated chamber with opposing elongated walls 220, 222, 224 and opposing ends 226. Mixing chambers 214 are referred to as "axially elongated" because the longitudinal length thereof may be generally aligned with an axis A of combustion liner 164. As shown in the top-down views of FIGS. 6A and 6C, opposing ends 226 may be rounded as they transition to respective walls 220, 224 or 222, 224. Although not shown, some curvature and/or narrowing from axially wavy inlet 216 to outlet 218 may be provided in axially extending mixing chambers 214, where desired. In addition, the number and arrangement of mixing chambers 214 may vary, for example, based on the fuel 114B being used and the size of combustor 100, among other factors. As previously described and as shown in FIGS. 6A-B, mixing chambers 214 may be arranged with two mixing chambers 214A-B, or as shown in FIG. 6C mixing chambers 214 may be arranged with three mixing chambers 214A-C. It is emphasized that the scope of the disclosure includes other arrangements not expressly shown.

Referring to FIG. 4, each mixing chamber 214 may extend radially relative to a circumference C of combustion liner 164 (right-to-left on page of FIG. 4). Hence, each axially elongated mixing chamber 214 extends radially relative to axis A of combustion liner 164, i.e., along a particular radial direction R. Alternatively, as shown in FIG. 4, first axially elongated mixing chamber 214A and second axially elongated mixing chamber 214B may be angled in opposite circumferential directions relative to a radial direction R. More particularly, first axially elongated mixing chamber 214A may be angled at a first angle α1 relative to radial direction R, and second axially elongated mixing chamber 214B may be angled at a second angle α2 relative to radial direction R. Hence, a centerline of mixing chambers 214A-B may not be parallel or co-extensive with a radial direction (R) relative to axis A of combustion liner 164. First angle α1 and second angle α2 may be equal. It will be recognized that the angling in a circumferential plane may vary depending on the number of mixing chambers 214 used. Mixing chambers 214A-B may also be angled relative to a radial direction R in an axial plane into and out the page of FIG. 4. This angling can also be seen in the top-down view of FIG. 6A. In this manner, mixing chambers 214A-B (extending into and out of page of FIG. 4) may be angled to direct air-fuel mixture 250 exiting therefrom toward axis A of combustion liner 164. Mixing chamber 214C in FIG. 6C may also include any of the angling described for mixing chambers 214A-B relative to FIGS. 4 and 6A.

Hereafter, first and second axially elongated mixing chambers 214A-B will be referred to as "mixing chambers" 214A or 214B as required, and any additional axially elongated mixing chamber 214C may be referred to herein as "additional mixing chamber 214C" for brevity. Collectively, the mixing chambers may be referenced as "mixing chambers 214". Any description of structure and function of mixing chambers 214A-B can be applied to additional mixing chamber 214C or any other mixing chambers provided as part of mixing member 210.

AFS injector 150 also includes a fuel plenum 230 defined in mixing member 210. In alternative embodiments, although not shown, fuel plenum 230 may be defined in air injection member 212. Fuel plenum 230 may extend within an upstream portion of at least one wall 220, 222, 224 of each respective mixing chamber 214A-B, or at least a portion of at least one wall 220, 222, 224 of any mixing chamber 214A-B necessary to supply fuel 114B to the desired mixing chambers 214. More particularly, fuel plenum 230 may extend around each mixing chamber 214 adjacent axially wavy inlet 216 and to any extent necessary to deliver fuel 114B where a set of fuel injectors 232 is located. AFS injector 150 and, more particularly, mixing member 210 may also include an inlet port 234 in fluid communication with fuel plenum 230 and configured to receive fuel 114B from fuel source 116 (FIGS. 1-2). Inlet port 234 of each AFS injector 150 may be fluidly coupled to fuel source 116 by, for example, fuel line(s) 188 (FIG. 2) and optionally a distribution plenum (not shown) about combustion liner 164. In any event, fuel plenum 230 is configured to deliver fuel 114B from fuel source 116 to each set of fuel injectors 232. As noted, fuel 114B may be any now known or later developed combustor fuel such as but not limited to fuel oil, natural gas, etc. Due to the advantages of AFS injector 150, fuel 114B may also include highly reactive fuels such as hydrogen. Fuel 114B may also include blends of fuels such as natural gas and hydrogen.

Mixing member 210 also includes a set of fuel injectors 232 defined in at least one wall 220, 222, 224 of each mixing chamber 214. Each fuel injector 232 is in fluid communication with fuel plenum 230 so that fuel 114B may be introduced into a respective mixing chamber 214, i.e., under pressure from fuel source 116. Fuel injectors 232 may be arranged in any manner to achieve the desired air-fuel mixture 250. More particularly, fuel injectors 232 in each set are configured to entrain fuel 114B in HP air flow 270 from injection member 212 to create the desired air-fuel mixture 250 for combustion in combustion liner 164. The type, number, spacing and size of fuel injectors 232 overall and within a given set may be chosen depending on a wide variety of characteristics of, for example, combustor 100, HP air 112B, LP air 182 (when used), and/or fuel 114B. In terms of fuel 114B, for example, the characteristics may include but are not limited to: gas type, level of reactivity, viscosity, desired flow rate or volume, pressure, temperature, etc. Similar characteristics of air 112B, 182 may also be considered.

In certain embodiments, shown in FIGS. 3 and 4 and the schematic view of FIG. 6D, each set 236 of fuel injectors 232 may include a single row of fuel injectors 232 in each of opposing side walls 220, 222 and/or middle wall 224 of a respective mixing chamber 214. The opposing sets 236 of fuel injectors 232 for a particular mixing chamber 214 may have the same arrangement but are more than likely different in terms of fuel injector 232 spacing, size, number, etc., to cause fuel 114B (FIG. 2) to better mix with HP air flow 270. The fuel injectors 232 within a given set 236 and within different sets 236 of fuel injectors 232 need not be identical.

FIG. 6D shows a schematic view of walls 220, 224 of mixing chamber 214A (could also be walls 222, 224 for mixing chamber 214B). Set 236A of fuel injectors 232A in one wall, e.g., wall 220 as shown in FIG. 6D, may be arranged in a different manner than set 236B of fuel injectors 232B defined in an opposing wall, e.g., wall 224 as shown in FIG. 6D, for each of mixing chamber 214A (or 214B). For example, the number, size, injector orientation, axial spacing, and radial spacing from outlet 218, among other physical features, of fuel injectors 232 may be different in the different side walls 220, 222, 224. In terms of the number of fuel injectors, in one non-limiting example, set 236A of fuel injectors 232A in one wall, e.g., wall 220, may include X number of fuel injectors 232; and set 236B of fuel injectors 232B in the other wall, e.g., wall 224, may include Y number of fuel injectors 232. The number X of fuel injectors 232A in set 236A in wall 220 does not equal the number Y of fuel injectors 232B in set 236B in wall 224. In the example shown, X<Y. Fuel injectors 232 for mixing chambers 214A-B may be non-uniformly spaced on both side walls 220, 224 or 222, 224 of a mixing chamber.

In another embodiment, as shown in the schematic view of FIG. 6E, for certain mixing chambers 214, the opposing sets 236C and 236D of fuel injectors 232C and 232D are identical in terms of fuel injector 232 spacing, size, number, etc. For example, as shown in the schematic view of FIG. 6E, mixing chamber 214B may include a first wall 222 and an opposing second wall 224, and sets 236C of fuel injectors 232C defined in wall 222 may be arranged in the same or similar manner to set 236D of fuel injectors 232D defined in wall 224. In this example, the same number of fuel injectors 232 are in opposing side walls 222, 224 of mixing chambers 214B. While particular examples have been shown for different mixing chambers 214A, 214B in FIGS. 6D-E, it will be recognized that the teachings of either FIG. 6D-E may be used for any mixing chamber.

In other embodiments (not shown), different sets of fuel injectors 232 may be spaced axially with respect to a given mixing chamber 214 and relative to an axis of a respective mixing chamber 214. Said differently, different sets of fuel injectors 232 may be spaced radially relative to the centerline of combustor 100. More particularly, as shown in FIG. 6D for example, first set of fuel injectors may be spaced a first distance from outlet 218 of a respective mixing chamber 214, and second set of fuel injectors may be spaced a second distance, greater than the first distance, from outlet 218 in the respective mixing chamber 214 of the plurality of mixing chambers.

Fuel injectors 232 may take any now known or later developed form of opening for delivering a particular type of fuel 114B to a respective mixing chamber 214. For example, fuel injectors 232 may be cylindrical openings or may have narrowing, nozzle cross-sections to distribute fuel 114B. In addition, fuel injectors 232 may introduce fuel 114B into a respective mixing chamber 214 in any desired direction. For example, fuel injectors 232 may introduce fuel 114B into a respective mixing chamber 214 at a perpendicular angle relative to an axis of the respective mixing chamber 214 and/or upstream side wall 222 thereof; at a non-perpendicular angle relative to upstream side wall 222 so as to impart rotation to fuel 114B; and/or at non-perpendicular angle radially outward or inward relative an axis of the respective mixing chamber 214, i.e., toward or away from combustion liner 164.

Regardless of embodiment, each set of fuel injectors 232 may be closer to axially wavy inlet 216 than outlet 218 of a respective mixing chamber 214 of the plurality of mixing chambers. In any event, fuel injector 232 arrangements are configured to maximize mixing of HP air flow 270 and fuel 114B (FIG. 2). Other arrangements tailored to characteristics of, for example, HP air flow 270, fuel 114B, and/or combustor 100, among other factors, are also possible.

Dimensions of mixing chambers 214 can be user defined based on many other factors, including but not limited to: characteristics of fuel 114B, HP air 112B, LP air 182 (when used), and/or dimensions of combustion liner 164. As shown in FIG. 4, the lengths of each mixing chamber 214A-B from axially wavy inlet 216 to outlet 218 are generally the same. The dimensions of any part of mixing member 210 (and HP air injection member 212) of AFS injectors 150 may be customized to create the desired air-fuel mixture 250.

Referring to FIGS. 3-5 and 7A-C, HP air injection member 212 will now be described. It is noted that injection member 212 may also be referred to as a "top hat." Injection member 212 defines a set 240 of HP air jets 242 for each mixing chamber 214. Outlets of HP air jets 242 are spaced from axially wavy inlet 216 of each mixing chamber 214 when AFS injector 150 is assembled. There are the same number of sets 240 of HP air jets 242 in injection member 212 as there are number of mixing chambers 214 in a given mixing member 210. For example, as shown in FIG. 7A, commensurate with two mixing chambers 214A-B in FIGS. 6A-B, two sets 240 of HP air jets 242 are shown, i.e., sets 240A and 240B. Injection member 212 is in fluid communication with HP air source 154 such that HP air 112B enters and is directed by sets 240 of HP air jets 242.

As will be described, each set 240 of HP air jets 242 is configured to direct HP air 112B from HP air source 154 and, in some embodiments, to draw LP air 182 from LP air source 184 to direct LP air 182 with HP air 112B into axially wavy inlet 216 of the respective mixing chamber 214. The collective flow is referenced herein as HP air flow 270 (FIGS. 3-4)—see arrow(s) extending toward axially wavy inlet 216 of a respective mixing chamber 214. Hence, HP air flow 270 includes HP air 112B and, optionally, LP air 182. It is noted that HP air flow 270 is referenced as high-pressure even in those embodiments where mixed with LP air 182 because it retains a relatively high pressure, although not as high as HP air 112B from HP air source 154, e.g., compressor discharge 109 (FIG. 2).

As shown in FIGS. 3-5, injection member 212 may optionally include a filter member 241 upstream of the set of HP air jets 242. Note, filter member 241 is not shown in FIG. 7A for clarity. Filter member 241 may include any now known or later developed filter structure capable of preventing unwanted contaminants from entering AFS injector 150 from HP air source 154.

FIG. 7B shows an enlarged top-down view of a number of HP air jets 242 in injection member 212, and FIG. 7C shows an enlarged cross-sectional view of HP air jets 242 of injection member 212 along view line 7C-7C in FIG. 7A. As shown in FIGS. 3 and 4, sets 240 of HP air jets 242 are spaced from axially wavy inlet 216 of plurality of axially extending mixing chambers 214 and, as shown in FIG. 7A, each include a plurality of axially spaced slots 244 defined through HP air injection member 212. Slots 244 may be axially spaced relative to axis A of combustion liner 164. Slots 244 are longer than they are wide and typically are relatively thin openings (i.e., having a narrow width). In certain embodiments, plurality of axially spaced slots 244 in a selected set 240 of HP air jets 242 may have different circumferential lengths (relative to axis A of combustion liner 164). For example, the different circumferential lengths may be arranged to generally correspond to a circumferential extent of axially wavy inlet 216 of a respective mixing chamber 214, e.g., with longer slots over longer open areas of axially wavy inlet 216, and shorter slots over shorter open areas of axially wavy slot 216.

FIG. 7B shows a portion of an illustrative set 240B of HP air jets 242 in FIG. 7A. As shown in FIG. 7B, the plurality of axially spaced slots 244 in each set 240 of HP air jets 242 may include repeating series of a long slot 244A having a first end 246 and a second end 248, a first shorter slot 244B circumferentially overlapping first end 246 of long slot 244A, and a second shorter slot 244C circumferentially overlapping second end 248 of long slot 244A. Shorter slots 244B have circumferentially outer ends 2470 that extend circumferentially beyond first ends 246 of long slot 244A, and shorter slots 244C have circumferentially inner ends 2471 that extend circumferentially beyond second end 248 of long slot 244A. (Note, in FIG. 7B, the circumferentially inner and outer references refer to the circumferential positions within injection member 212 as shown in FIG. 7A for set 240B. The inner and outer references would be switched relative to set 240A of HP air jets 242 in FIG. 7A.)

Shorter slots 244B have the circumferentially outermost ends 2470 (up-down on page of FIG. 7B), and shorter slots 244C have circumferentially innermost ends 2471 (up-down on page of FIG. 7B). As shown in FIG. 7A, the repeating series collectively may have a wavy layout that generally corresponds to axially wavy inlet 216. Slots 244X at an end of a set 240 may not continue the series and may have lengths different than any other slot 244 in the respective set. As shown in FIG. 7A, slots 244 from set 240A in FIG. 7A are arranged in a mirror-image of the slots 244 of set 240B.

Each slot 244 in a set 240 of HP air jets 242 from a radially inner end thereof to a radially outer end thereof may be angled in any fashion to direct HP air 112B as desired, e.g., to match an angle (e.g., radial or angle α1 or α2 (FIG. 4)) of a respective mixing chamber 214 to which HP air 112B passing therethrough is to be directed. Notably, each slot 244 in a set 240 of HP air jets 242 does not necessarily require the angle, e.g., angle α1 or α2, of the respective mixing chamber 214 to which directed, i.e., in a radial or close to radial direction, but a given set 240 of HP air jets 242 may each be angled such that collectively HP air flow 270, which may include HP air 112B and LP air 182, from the given set has an angle (not labeled for clarity) substantially identical to the angle of the respective mixing chamber 214 relative to axis A of combustion liner 164.

FIG. 7C shows an enlarged cross-sectional view of HP air jets 242 of injection member 212 along view line 7C-7C in FIG. 7A, i.e., through long slots 244A in different sets 240A-B of HP air jets 242. In the example shown in FIG. 7A, an arrangement of sets 240A-B of HP air jets 242 spaced from axially wavy inlets 216 of outer mixing chambers 214A-B are the same, but they may be different for different mixing chambers 214. The differences in arrangement can take any form such as but not limited to layout, size, shape and/or number of HP air jets 242 in each set 240. In terms of number, each set 240 of HP air jets 242 may include any number of HP air jets 242. For example, with reference to FIG. 6C, sets 240A-B of HP air jets 242 spaced from axially wavy inlet 216 of mixing chambers 214A-B may have a lower number of HP air jets 242 than a set of HP air jets (not shown) spaced from axially wavy inlet 216 of mixing chamber 214C. In those embodiments which incorporate LP air 182 into HP air flow 270, a lower number of HP air jets 242 may be advantageous on mixing chambers 214A-B to reduce any impeding of LP air 182 flow to center mixing chamber 214C as it flows into mixing member 210. In any event, each set 240 of HP air jets 242 spaced from the axially wavy inlet 216 of the plurality of axially extending mixing chambers includes a plurality of axially spaced slots defined through the HP air injection member 212. While particular numbers of HP air jets 242 are shown in each set 240, any number of HP air jets 242 may be used in each set 240.

In the examples shown, each HP air jet 242 may have a linear slot cross-sectional shape, e.g., to ease passage of LP air 182 from circumferentially outer sides (left and right sides in FIGS. 3-4) of injection member 212 to mixing chambers 214, and notably, mixing chamber 214C in FIG. 6C. However, slots 244 of HP air jets 242 may alternatively have cross-sectional shapes such as but not limited to circular, elliptical, airfoil, etc. While particular arrangements for each set are shown in the drawings, other arrangements are also possible. In operation, as shown in FIG. 7C, slots 244 in HP jets 242 increase contact area of HP air 112B and LP air 182 to increase shear stress contact and more quickly mix the two air flows, creating air flow 270.

With further regard to HP air jet 242 configurations, and as shown in FIGS. 3, 4 and 7C, sets 240A-B of HP air jets 242 are spaced from axially wavy inlets 216A, 216B of mixing chambers 214A, 214B, and, in certain embodiments, each may include a radially inward extending collar 252. Collars 252 direct HP air jets 242 toward mixing chambers 214A-B. Additionally, in embodiments where LP air 182 is used, collars 252 may have an airfoil cross-sectional shape to ease flow of LP air 182 thereabout, i.e., facing in circumferential sides 267, 269 (FIG. 7A) of injection member 212 where LP air 182 enters HP air flow 270 between mixing member 210 and injection member 212.

In any event, collars 252 have a first (leading) side 254 thereof closer to mixing member 210 than a second, opposite (trailing) side 256 thereof. That is, first sides 254 are radially closer to mixing member 210 than second sides 256. More particularly, first sides 254 are radially closer to a radially outer surface of walls 220, 222, respectively, than second sides 256 are from a radially outer surface of middle wall 224. Moreover, first sides 254 are circumferentially closer to circumferential sides 267, 269, while second sides 256 are circumferentially closer to an axial centerline of injection member 212. First sides 254 may be radially over walls 220, 222, and second sides 256 may be over middle wall 224. In some embodiments, first sides 254 present a leading edge of the airfoil cross-section of collars 252 to LP air 182 as it encounters collars 252, and thus act to ease flow of LP air 182 to mixing chambers 214A-B, e.g., by directing it towards mixing chambers 214A-B.

Referring to FIGS. 5 and 6A-B, in an optional embodiment, middle wall 224 may further include an air purge system to reduce the impact or eliminate a wake that may exist in air-fuel mixture 250 downstream of a trailing edge 260 (FIG. 5) of middle wall 224 at outlet 218 of mixing chambers 214. As shown in FIG. 5, middle wall 224 may include an HP air purge plenum 262 defined therein. HP air purge plenum 262 may have any shape and/or configuration to collect HP air, e.g., HP air 112B with or without LP air 182 therein. The air flow in the air purge system may have a pressure lower than HP air 112B and higher than LP air 182. A plurality of HP air feed passages 264 (FIG. 5) may extend from HP air purge plenum 262 through a radially outer end 266 (FIGS. 5 and 6A) of middle wall 224 adjacent axially wavy inlet 216 of plurality of axially extending mixing chambers 214. HP air feed passages 264 are in fluid communication with HP air source 154 and LP air source 184, i.e., HP air 112B and/or LP air 182 may enter HP air feed passages 264 via openings in radially outer end 266 of middle wall 224.

As shown in FIG. 5, at least one HP air purge opening 268 extends from HP air purge plenum 262 through trailing edge 260 of middle wall 224 adjacent outlet 218 of plurality of axially extending mixing chambers 214. HP air purge opening 268 can take any form such as but not limited to a plurality of holes (shown in FIGS. 5 and 6B), a single slot, or a number of slots, through trailing edge 260 of middle wall 224. HP air purge opening(s) 268 may be aimed directly downstream, i.e., radially relative to axis A of combustion liner 164, or may angled slightly toward mixing chamber(s) 214A, 214B. HP air exiting HP air purge opening(s) 268 reduces and/or eliminates any wake in air-fuel mixture 250.

With regard to HP air 112B intake from HP air source 154, sets 240 of HP air jets 242 are spaced from axially wavy inlet 216 of each mixing chamber 214 and are configured to direct HP air flow 270 (see arrows) therefrom including HP air 112B into a respective mixing chamber 214. As noted, injection member 212 is in fluid communication with HP air source 154 such that HP air 112B enters HP air jets 242. Sets 240 of HP air jets 242 are spaced from axially wavy inlet 216 of each mixing chamber 214 and are configured to direct HP air 112B therefrom and, in some embodiments, to draw LP air 182 therein to form HP air flow 270. HP jets 242 also direct HP air flow 270 into a respective mixing chamber 214.

More particularly, HP jets 242 may direct HP air flow 270 into a respective mixing chamber 214 at any angle, e.g., that is created by a respective mixing chamber 214 relative to axis A of combustion liner 164. As noted, each HP jet 242 in a set does not necessarily have the angle, e.g., angle α1 or α2, of the respective mixing chamber 214, but a given set 240 of HP air jets 242 are each angled such that collectively HP air flow 270, including HP air 112B and (optional) LP air 182, from the given set has an angle (not labeled for clarity) substantially identical to the angle of the respective mixing chamber 214 relative to axis A of combustion liner 164. More particularly, as shown in FIG. 4, HP air flow 270 from set 240A (FIG. 7A) of HP air jets 242 has the angle of mixing chamber 214A, and HP air flow 270 from set 240B (FIG. 7A) of HP air jets 242 has the angle of mixing chamber 214B. Collars 252 may also be angled at the same angles as mixing chambers 214A-B.

In operation, as shown in FIGS. 3-5, mixing chambers 214 mix HP air flow 270 with fuel 114B entering from fuel injectors 232. As noted, each HP air jet 242 is configured to direct HP air flow 270 toward axially wavy inlet 216 of a respective mixing chamber 214 including HP air 112B from HP air source 154. In some embodiments, HP air jets 242 draw LP air 182 from LP air source 184 therein in the space between HP air jets 242 and mixing member 210, i.e., creating an ejector for LP air 182. HP air flow 270 impinges on axially wavy inlets 216 of mixing chambers 214 or, more accurately, leading edges of mixing chambers 214, creating vortices and promoting in-plane mixing (plane of upper surface of mixing member 210) of HP air 112B, LP air 182, and fuel 114B.

In one non-limiting example, HP air 112B may constitute in a range of 45 to 55% of total of HP air 112B and LP air 182, and LP air 182 may constitute in a range of 45 to 55% of total of HP air 112B and LP air 182. In this manner, AFS injectors 150 using two sources of air reduce overall system pressure loss and more efficiently use air in combustor 100.

AFS injector 150, i.e., mixing member 210 and injection member 212, may be made of any now known or later developed combustion tolerant and oxidation resistant materials. The material may be metal and can be a pure metal or an alloy. AFS injectors 150 may include a metal that is typically used in turbine component such as turbine blades or nozzles and has a higher temperature and higher oxidation tolerance than materials typically used for combustion hardware. In this case, the material may include a non-reactive metal, e.g., made from a non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), a nickel-chromium-cobalt-molybdenum alloy (NiCrCoMo) (e.g., Haynes 233 or Haynes 282 available from Haynes International, Inc.), or a nickel-chromium-cobalt-titanium alloy (NiCiCoTi) (e.g., GTD 262 developed by General Electric Company). Other possibilities include, for example, René 108, CM 247, Mar M 247, and any precipitation harden-able (PH) nickel alloy.

In certain embodiments, AFS injectors 150, i.e., mixing member 210 and/or injection member 212, may be additively manufactured using any now known or later developed technique capable of forming an integral body. Consequently, as shown in FIG. 8, mixing member 210 and/or injection member 212 includes a plurality of parallel, sintered metal layers 280. FIG. 9 shows a schematic/block view of an illustrative computerized metal powder additive manufacturing system 310 (hereinafter 'AM system 310') for generating AFS injector 150, i.e., mixing member 210 and/or injection member 212, of which only a single layer is shown. The teachings of the disclosures will be described relative to building mixing member 210 and/or injection member 212 using multiple melting beam sources 312, 314, 316, 318, but it is emphasized and will be readily recognized that the teachings of the disclosure are equally applicable to build mixing member 210 and/or injection member 212 using any number of melting beam sources. In this example, AM system 310 is arranged for direct metal laser melting (DMLM). It is understood that the general teachings of the disclosure are equally applicable to other forms of metal powder additive manufacturing such as but not limited to selective laser melting (SLM), and perhaps other forms of additive manufacturing (i.e., other than metal powder applications). The layer of mixing member 210 and/or injection member 212 in build platform 320 is illustrated as a circular element in FIG. 9; however, it is understood that the additive manufacturing process can be readily adapted to manufacture any shape on build platform 320.

AM system 310 generally includes an additive manufacturing control system 330 ("control system") and an AM printer 332. As will be described, control system 330 executes set of computer-executable instructions or code 334 to generate mixing member 210 and/or injection member 212 using multiple melting beam sources 312, 314, 316, 318. In the example shown, four melting beam sources may include four lasers. However, the teachings of the disclosures are applicable to any melting beam source, e.g., an electron beam, laser, etc. Control system 330 is shown implemented on computer 336 as computer program code. To this extent, computer 336 is shown including a memory 338 and/or storage system 340, a processor unit (PU) 344, an input/output (I/O) interface 346, and a bus 348. Further, computer 336 is shown in communication with an external I/O device/resource 350.

In general, processor unit (PU) 344 executes computer program code 334 that is stored in memory 338 and/or storage system 340. While executing computer program code 334, processor unit (PU) 344 can read and/or write data to/from memory 338, storage system 340, I/O device 350 and/or AM printer 332. Bus 348 provides a communication link between each of the components in computer 336, and I/O device 350 can comprise any device that enables a user to interact with computer 336 (e.g., keyboard, pointing device, display, etc.). Computer 336 is only representative of various possible combinations of hardware and software. For example, processor unit (PU) 344 may comprise a single processing unit or be distributed across one or more processing units in one or more locations, e.g., on a client and server. Similarly, memory 338 and/or storage system 340 may reside at one or more physical locations. Memory 338 and/or storage system 340 can comprise any combination of various types of non-transitory computer readable storage medium including magnetic media, optical media, random access memory (RAM), read only memory (ROM), etc. Computer 336 can comprise any type of computing device such as an industrial controller, a network server, a desktop computer, a laptop, a handheld device, etc.

As noted, AM system 310 and, in particular control system 330, executes code 334 to generate mixing member 210 and/or injection member 212. Code 334 can include, among other things, a set of computer-executable instructions 334S (herein also referred to as 'code 334S') for operating AM printer 332, and a set of computer-executable instructions 334O (herein also referred to as 'code 334O') defining mixing member 210 and/or injection member 212 to be physically generated by AM printer 332. As described herein, additive manufacturing processes begin with a non-transitory computer readable storage medium (e.g., memory 338, storage system 340, etc.) storing code 334. Set of computer-executable instructions 334S for operating AM printer 332 may include any now known or later developed software code capable of operating AM printer 332.

The set of computer-executable instructions 334O defining mixing member 210 and/or injection member 212 may include a precisely defined 3D model of mixing member 210 and/or injection member 212 and can be generated from any of a large variety of well-known computer aided design (CAD) software systems such as AutoCAD®, TurboCAD®, DesignCAD 3D Max, etc. In this regard, code 334O can include any now known or later developed file format. Furthermore, code 334O representative of mixing member 210 and/or injection member 212 may be translated between different formats. For example, code 334O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 334O representative of mixing member 210 and/or injection member 212 may also be converted into a set of data signals and transmitted, received as a set of data signals and converted to code, stored, etc., as necessary. Code 334O may be configured according to embodiments of the disclosure to allow for formation of border and internal sections in overlapping field regions, as will be described. In any event, code 334O may be an input to AM system 310 and may come from a part designer, an intellectual property (IP) provider, a design company, the operator or owner of AM system 310, or from other sources. In any event, control system 330 executes code 334S and 334O, dividing mixing member 210 and/or injection member 212 into a series of thin slices that assembles using AM printer 332 in successive layers of material.

AM printer 332 may include a processing chamber 360 that is sealed to provide a controlled atmosphere for mixing member 210 and/or injection member 212 printing. A build platform 320, upon which mixing member 210 and/or injection member 212 is/are built, is positioned within processing chamber 360. A number of melting beam sources 312, 314, 316, 318 are configured to melt layers of metal powder on build platform 320 to generate mixing member 210 and/or injection member 212. While four melting beam sources 312, 314, 316, 318 are illustrated, it is emphasized that the teachings of the disclosure are applicable to a system employing any number of sources, e.g., 1, 2, 3, or 5 or more. As understood in the field, each melting beam source 312, 314, 316, 318 may have a field including a non-overlapping field region, respectively, in which it can exclusively melt metal powder, and may include at least one overlapping field region in which two or more sources can melt metal powder. In this regard, each melting beam source 312, 314, 316, 318 may generate a melting beam, respectively, that fuses particles for each slice, as defined by code 334O. For example, in FIG. 9, melting beam source 312 is shown creating a layer of mixing member 210 and/or injection member 212 using melting beam 362 in one region, while melting beam source 314 is shown creating a layer of mixing member 210 and/or injection member 212 using melting beam 362' in another region.

Each melting beam source 312, 314, 316, 318 is calibrated in any now known or later developed manner. That is, each melting beam source 312, 314, 316, 318 has had its laser or electron beam's anticipated position relative to build platform 320 correlated with its actual position in order to provide an individual position correction (not shown) to ensure its individual accuracy. In one embodiment, each of plurality melting beam sources 312, 314, 316, 318 may create melting beams, e.g., 362, 362', having the same cross-sectional dimensions (e.g., shape and size in operation), power and scan speed.

Continuing with FIG. 9, an applicator (or re-coater blade) 370 may create a thin layer of raw material 372 spread out as the blank canvas from which each successive slice of the final mixing member 210 and/or injection member 212 will be created. Various parts of AM printer 332 may move to accommodate the addition of each new layer, e.g., a build platform 320 may lower and/or chamber 360 and/or applicator 370 may rise after each layer. The process may use different raw materials in the form of fine-grain metal powder, a stock of which may be held in a powder reservoir 368 accessible by applicator 370.

Processing chamber 360 is filled with an inert gas such as argon or nitrogen and controlled to minimize or eliminate oxygen. Control system 330 is configured to control a flow of a gas mixture 374 within processing chamber 360 from a source of inert gas 376. In this case, control system 330 may control a pump 380, and/or a flow valve system 382 for inert gas to control the content of gas mixture 374. Flow valve system 382 may include one or more computer controllable valves, flow sensors, temperature sensors, pressure sensors, etc., capable of precisely controlling flow of the particular gas. Pump 380 may be provided with or without valve system 382. Where pump 380 is omitted, inert gas may simply enter a conduit or manifold prior to introduction to processing chamber 360. Source of inert gas 376 may take the form of any conventional source for the material contained therein, e.g., a tank, reservoir or other source. Any sensors (not shown) required to measure gas mixture 374 may be provided. Gas mixture 374 may be filtered using a filter 386 in a conventional manner.

In operation, build platform 320 with metal powder thereon is provided within processing chamber 360, and control system 330 controls flow of gas mixture 374 within processing chamber 360 from source of inert gas 376. Control system 330 also controls AM printer 332, and in particular, applicator 370 and melting beam sources 312, 314, 316, 318 to sequentially melt layers of metal powder on build platform 320 to generate mixing member 210 and/or injection member 212 according to embodiments of the disclosure. While a particular AM system 310 has been described herein, it is emphasized that the teachings of the disclosure are not limited to any particular additive manufacturing system or method.

Once mixing member 210 and injection member 212 are formed, as shown in FIG. 2, they may be assembled to form AFS injector 150 with other parts of combustor 100. For example, as shown in FIGS. 3-5, mixing member 210 and/or injection member 212 may be bolted to AFS injector mounts 274 (FIGS. 3-5) therefor on combustion liner 164. More particularly, as noted, mixing member 210 and HP air injection member 212 may each include at least one mounting element 213 configured to receive fastener 215, e.g., bolt or weld, to couple mixing member 210 and HP air injection member 212 to combustion liner 164 that defines combustion chamber 172, i.e., to AFS injector mounts 274 of combustion liner 164.

As shown in FIGS. 3-5, a perimeter of HP injection member 212 rests upon an outward surface of forward flow sleeve 177 or aft flow sleeve 190, and mixing member 210 extends outwardly from combustion liner 164 within an opening in flow sleeve 177, 190. A gap may be defined between an interior surface of HP air injection member 212 and mixing member 210, thereby permitting the flow of LP air 182 from the opening into the interior of AFS interior 150. In such embodiments, LP air 182 is entrained with HP air 112B flowing through HP injection member 212.

In other embodiments (not shown), use of LP air 182 may be omitted by blocking the flow from LP air source 184 into AFS injector 150, such that AFS injector 150 is not in fluid communication with LP air source 184. In such embodiments, mixing member 210 and/or injection member 212 may include an axially extending wall that extends between mixing member 210 and the interior surface of HP injection member 212. This wall prevents any LP air 182 from entering mixing chamber 214. More particularly, this wall defines a sealed chamber between mixing member 210 and injection member 212 that prevents any additional (LP) air from entering air-fuel mixture 250 exiting from HP air-fuel injectors 232. AFS injector 150, so configured, uses only HP air 112B for mixing with fuel and does not receive post-impingement air as LP air 182.

Embodiments of the disclosure may also include combustor 100 for GT system 90. Combustor 100 includes combustor body 160 including combustion liner 164. Combustor 100 may also include a plurality of AFS injectors 150, as described herein, directed into combustion liner 164. Returning to FIG. 2, combustor 100 generally terminates at a point that is adjacent to a first stage 282 of stationary nozzles 284 of turbine 128. First stage 282 of stationary nozzles 284 at least partially defines turbine inlet 142 to turbine 128. Combustor body 160, i.e., combustion liner 164, at least partially defines a hot gas path (HGP) for routing combustion gases 122 from primary combustion zone 202 and secondary combustion zone 204 to turbine inlet 142 of turbine 128 during operation of GT system 90. Due to the small size of AFS injectors 150, they can be assembled onto combustion liner 164 of combustor body 160 (FIG. 2), and combustor body 160 can be installed into GT system 90 in an axial direction through the relatively small opening (not shown) in a compressor discharge casing (in casing 152).

Embodiments of the disclosure may also include, as shown in FIG. 1, GT system 90 including compressor section 110, combustion section 120 operatively coupled to compressor section 110, and turbine section 130 operatively coupled to combustion section 120. As described herein, combustion section 120 includes at least one combustor 100 including combustor body 160 including combustion liner 164, and head end fuel nozzle assembly 176 at a forward end of combustor body 160. Combustor 100 may also include a plurality of AFS injectors 150, as described herein, directed into combustor body 160, i.e., into combustion liner 164, downstream of head end assembly 176.

The disclosure provides various technical and commercial advantages, examples of which are discussed herein. As described herein, the AFS injector can accept high-pressure air and, optionally, low-pressure air, e.g., post-impingement cooling air, to reduce overall system pressure loss. The AFS injector can rapidly premix the air source(s) with, for example, highly reactive fuels, like hydrogen, to achieve low emissions, e.g., of nitrous oxide (NOx), with acceptable flame holding capability. The AFS injector provides high mixedness of fuel and air, minimizes flow-pressure loss, and prevents fuel from entering any low velocity air flow zones. The axially wavy inlets provide narrower chambers than just straight slots and provide lower pressure loss and easier introduction of fuel and LP air into the mixing chambers. Additionally, the AFS injector has a relatively small radial height (labeled "RH" in FIG. 4) from top to bottom, allowing the AFS injectors to be assembled onto the combustion liner of a combustor body, and the combustor body installed axially into the GT system through the relatively small opening in a compressor discharge casing.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and its practical application and to enable others of ordinary skill in the art to understand the disclosure for envisioning embodiments with various modifications as are suited to the particular use contemplated.

What is claimed is:

1. An axial fuel stage (AFS) injector for a combustor of a gas turbine (GT) system, the AFS injector comprising:
   a mixing member including:
      a plurality of axially elongated mixing chambers defined in the mixing member, wherein each axially elongated mixing chamber has a respective length in an axial direction of a combustion liner of the combustor that is longer than a respective width of the respective axially elongated mixing chamber, wherein each axially elongated mixing chamber includes an outlet and an axially wavy inlet, and wherein each outlet is configured to be in fluid communication with a combustion chamber of the combustor, and
      a set of fuel injectors defined in at least one wall of each axially elongated mixing chamber;
   a high pressure (HP) air injection member defining a set of HP air jets spaced from the axially wavy inlet of each axially elongated mixing chamber; and
   a fuel plenum defined in the mixing member, the fuel plenum configured to deliver fuel from a fuel source to each set of fuel injectors,
   wherein each set of HP air jets is configured to direct a HP air from a HP air source into the axially wavy inlet of a respective mixing chamber where the fuel is injected by the set of fuel injectors, and wherein the HP air is at a first pressure that is higher than a second pressure at which low pressure (LP) air is supplied to the AFS injector.

2. The AFS injector of claim 1, wherein the mixing member includes a first wall, a second wall and a middle wall between the first wall and the second wall, and the plurality of mixing chambers includes a first axially elongated mixing chamber defined by the first wall and the middle wall and a second axially elongated mixing chamber defined by the second wall and the middle wall.

3. The AFS injector of claim 2, wherein the middle wall further includes:
   an HP air purge plenum defined therein;
   a plurality of HP air feed passages extending from the HP air purge plenum through a radially outer end of the middle wall adjacent the axially wavy inlet of the plurality of axially extending mixing chambers, wherein the plurality of HP air feed passages is in fluid communication with the HP air source; and
   at least one HP air purge opening extending from the HP air purge plenum through a trailing edge of the middle wall adjacent the outlet of the plurality of axially extending mixing chambers.

4. The AFS injector of claim 1, wherein each set of HP air jets spaced from the axially wavy inlets of the plurality of axially extending mixing chambers includes a plurality of axially spaced slots defined through the HP air injection member.

5. The AFS injector of claim 4, wherein the plurality of axially spaced slots in a selected set of HP air jets have different circumferential lengths.

6. The AFS injector of claim 5, wherein the plurality of axially spaced slots in the selected set of HP air jets includes a repeating series of a long slot having a first end and a second end, a first shorter slot circumferentially overlapping the first end of the long slot, and a second shorter slot circumferentially overlapping the second end of the long slot, wherein the repeating series collectively has a wavy layout corresponding to a circumferential extent of the axially wavy inlet of a respective axially elongated mixing chamber.

7. The AFS injector of claim 1, wherein the fuel plenum extends within an upstream portion of at least one wall of each of the axially elongated mixing chambers, wherein each set of fuel injectors is closer to the axially wavy inlet than the outlet of a respective axially elongated mixing chamber of the plurality of axially elongated mixing chambers.

8. The AFS injector of claim 1, wherein each axially elongated mixing chamber extends radially relative to a circumference of the combustion liner of the combustor.

9. The AFS injector of claim 1, wherein the set of HP air jets spaced from the axially wavy inlet of the plurality of axially elongated mixing chambers each include a radially inward extending collar having a first side radially closer to the mixing member than a second, opposite side of the radially inward extending collar.

10. The AFS injector of claim 1, wherein the mixing member and the HP air injection member each include at least one mounting element configured to receive a fastener to couple the mixing member and the HP air injection member to the combustion liner that defines the combustion chamber.

11. The AFS injector of claim 1, wherein each set of HP air jets is configured to draw the LP air from an LP air source to direct the LP air with the HP air into the inlet of each respective mixing chamber; wherein the HP air source is in direct fluid communication with a compressor discharge of the GT system, and the LP air source is in fluid communication with a cooling passage defined along at least a portion of the combustion liner of the combustor; wherein the cooling passage is downstream of an impingement cooling member that is in direct fluid communication with the compressor discharge of the GT system.

12. A combustor for a gas turbine system, the combustor comprising:
a combustor body including a combustion liner; and
a plurality of axial fuel stage (AFS) injectors directed into the combustion liner, at least one AFS injector of the plurality of AFS injectors including:
a mixing member including:
a plurality of axially elongated mixing chambers defined in the mixing member, wherein each axially elongated mixing chamber has a respective length in an axial direction of the combustion liner of the combustor that is longer than a respective width of the respective axially elongated mixing chamber, wherein each axially elongated mixing chamber includes an outlet and an axially wavy inlet, and
wherein each outlet is configured to be in fluid communication with a combustion chamber of the combustor, and
a set of fuel injectors defined in at least one wall of each axially elongated mixing chamber;
a high pressure (HP) air injection member defining a set of HP air jets spaced from the axially wavy inlet of each axially elongated mixing chamber; and
a fuel plenum defined in the mixing member, the fuel plenum configured to deliver fuel from a fuel source to each set of fuel injectors,
wherein each set of HP air jets is configured to direct a HP air from a HP air source into the axially wavy inlet of a respective mixing chamber where the fuel is injected by the set of fuel injectors, and wherein the HP air is at a first pressure that is higher than a second pressure at which low pressure (LP) air is supplied to the AFS injector.

13. The combustor of claim 12, wherein the mixing member includes a first wall, a second wall and a middle wall between the first wall and the second wall, and the plurality of mixing chambers includes a first axially elongated mixing chamber defined by the first wall and the middle wall and a second axially elongated mixing chamber defined by the second wall and the middle wall.

14. The combustor of claim 13, wherein the middle wall further includes:
an HP air purge plenum defined therein;
a plurality of HP air feed passages extending from the HP air purge plenum through a radially outer end of the middle wall adjacent the axially wavy inlet of the plurality of axially extending mixing chambers, wherein the plurality of HP air feed passages is in fluid communication with the HP air source; and
at least one HP air purge opening extending from the HP air purge plenum through a trailing edge of the middle wall adjacent the outlet of the plurality of axially extending mixing chambers.

15. The combustor of claim 12, wherein each set of HP air jets spaced from the axially wavy inlets of the plurality of axially extending mixing chambers includes a plurality of axially spaced slots defined through the HP air injection member.

16. The combustor of claim 15, wherein the plurality of axially spaced slots in each set of HP air jets includes a repeating series of a long slot having a first end and a second end, a first shorter slot circumferentially overlapping the first end of the long slot, and a second shorter slot circumferentially overlapping the second end of the long slot, wherein the repeating series collectively has a wavy layout corresponding to a circumferential extent of the axially wavy inlet of a respective axially elongated mixing chamber.

17. The combustor of claim 12, wherein the fuel plenum extends within an upstream portion of the respective walls of each of the axially elongated mixing chambers, wherein each set of fuel injectors is closer to the axially wavy inlet than the outlet of a respective axially elongated mixing chamber of the plurality of axially elongated mixing chambers.

18. The combustor of claim 12, wherein the mixing member and the HP air injection member each include at least one mounting element configured to receive a fastener to couple the mixing member and the HP air injection member to the combustion liner that defines the combustion chamber.

19. The combustor of claim 12, wherein each set of HP air jets is configured to draw the LP air from an LP air source to direct the LP air with the HP air into the inlet of each respective mixing chamber; wherein the HP air source is in direct fluid communication with a compressor discharge of the GT system and the LP air source is in fluid communication with a cooling passage defined along at least a portion of the combustion liner; wherein the cooling passage is downstream of an impingement cooling member that is in direct fluid communication with the compressor discharge of the GT system.

20. A gas turbine (GT) system, comprising:
 a compressor section;
 a combustion section operatively coupled to the compressor section; and
 a turbine section operatively coupled to the combustion section, wherein the combustion section includes at least one combustor including:
  a combustor body including a combustion liner;
  a head end fuel nozzle assembly at a forward end of the combustor body; and
  a plurality of axial fuel stage (AFS) injectors directed into the combustor body downstream of the head end fuel nozzle assembly, each AFS injector including:
   a mixing member including:
    a plurality of axially elongated mixing chambers defined in the mixing member, wherein each axially elongated mixing chamber has a respective length in an axial direction of the combustion liner of the combustor that is longer than a respective width of the respective axially elongated mixing chamber, wherein each axially elongated mixing chamber includes an outlet and an axially wavy inlet, and wherein each outlet is configured to be in fluid communication with a combustion chamber of the combustor, and
    a set of fuel injectors defined in at least one wall of each axially elongated mixing chamber;
   a high pressure (HP) air injection member defining a set of HP air jets spaced from the axially wavy inlet of each axially elongated mixing chamber; and
   a fuel plenum defined in the mixing member, the fuel plenum configured to deliver fuel from a fuel source to each set of fuel injectors,
  wherein each set of HP air jets is configured to direct a HP air from a HP air source into the axially wavy inlet of a respective mixing chamber where the fuel is injected by the set of fuel injectors, and wherein the HP air is at a first pressure that is higher than a second pressure at which low pressure (LP) air is supplied to the AFS injector.

* * * * *